United States Patent
Ogawa et al.

(10) Patent No.: US 9,551,812 B2
(45) Date of Patent: Jan. 24, 2017

(54) ADHESIVE COMPOSITION, ADHESIVE LAYER, OPTICAL MEMBER, AND ADHESIVE SHEET

(75) Inventors: Hirosh Ogawa, Yokohama (JP); Tatsuhiro Suwa, Yokohama (JP)

(73) Assignee: CHEIL INDUSTRIES, INC., Gumi-Si, Kyeongsangbuk-Do (KR)

( * ) Notice: Subject to any disclaimer, the term of this patent is extended or adjusted under 35 U.S.C. 154(b) by 873 days.

(21) Appl. No.: 13/482,259

(22) Filed: May 29, 2012

(65) Prior Publication Data

US 2012/0309873 A1   Dec. 6, 2012

(30) Foreign Application Priority Data

May 30, 2011   (JP) .................................. 2011-121076
Oct. 11, 2011   (KR) ........................ 10-2011-0103771

(51) Int. Cl.
| | | |
|---|---|---|
| C09J 133/08 | (2006.01) | |
| G02B 1/04 | (2006.01) | |
| C08L 33/08 | (2006.01) | |
| C08L 33/10 | (2006.01) | |

(52) U.S. Cl.
CPC ................. *G02B 1/04* (2013.01); *C08L 33/08* (2013.01); *C08L 33/10* (2013.01); *C09J 133/08* (2013.01)

(58) Field of Classification Search
CPC ........... C09J 133/08; G02B 1/04; C08L 33/08; C08L 33/10
USPC ........................................................ 524/174
See application file for complete search history.

(56) References Cited

U.S. PATENT DOCUMENTS

| | | | |
|---|---|---|---|
| 7,518,008 B2 | | 4/2009 | Yamada et al. |
| 7,923,503 B2 * | | 4/2011 | Takahashi et al. ........... 524/460 |
| 8,513,363 B2 * | | 8/2013 | Suwa et al. ................ 525/329.9 |
| 8,604,130 B2 * | | 12/2013 | Ogawa et al. ................ 525/100 |
| 2008/0076878 A1 | | 3/2008 | Wakioka et al. |
| 2010/0080991 A1* | | 4/2010 | Kishioka et al. ......... 428/355 R |
| 2011/0111140 A1* | | 5/2011 | Jang et al. ................... 428/1.33 |
| 2012/0108734 A1* | | 5/2012 | Ogawa et al. ................ 524/558 |

FOREIGN PATENT DOCUMENTS

| | | |
|---|---|---|
| JP | 2003-519631 A | 6/2003 |
| JP | 2009-292731 A | 12/2009 |
| JP | 2010-065102 A | 3/2010 |
| JP | 2010-217227 A | 9/2010 |
| WO | WO 01/51536 A1 | 7/2001 |
| WO | WO 2005/108499 A1 | 11/2005 |

OTHER PUBLICATIONS

USPTO Action mailed Sep. 12, 2013, in application published as US 2012/0315476 A1, Dec. 13, 2012, Ogawa, et al.
USPTO Action mailed Sep. 13, 2013, in application published as US 2012-0316294 A1, Dec. 13, 2012, Ogawa et al.

* cited by examiner

*Primary Examiner* — Angela C Scott
(74) *Attorney, Agent, or Firm* — Lee & Morse, P.C.

(57) ABSTRACT

An adhesive composition, an adhesive layer, an optical member, and an adhesive sheet, the adhesive composition including 100 parts by weight of a (meth)acrylic copolymer, the (meth)acrylic copolymer having a weight average molecular weight of about 100,000 to about 2,000,000 g/mol; about 0.05 to about 5 parts by weight of a carbodiimide crosslinker; and about 0.01 to about 0.3 parts by weight of an organic group-containing compound, the organic group-containing compound including at least one selected from the group of titanium, zirconium, and hafnium.

13 Claims, 8 Drawing Sheets

FIG. 1: Table 2

| Composition of polymer (A) | | Preparation Example | | | | | | | |
|---|---|---|---|---|---|---|---|---|---|
| | Sample | 1 | 2 | 3 | 4 | 5 | 6 | 7 | 8 |
| | | A-1 | A-2 | A-3 | A-4 | A-5 | A-6 | A-7 | A-8 |
| Monomer (parts by weight) | BA | 89.4 | 98 | 95.8 | 87 | 88 | 93.5 | 79.2 | 82 |
| | MA | 10 | - | 3 | 4 | 7 | 5 | 20 | 15 |
| | HEA | - | - | 0.2 | - | - | - | - | - |
| | 4HBA | 0.1 | - | - | - | - | - | - | - |
| | HEAA | - | - | - | - | - | 0.3 | - | - |
| | AA | 0.5 | 2 | 1 | 9 | 5 | 1.2 | 0.8 | 3 |
| Total (parts by weight) | | 100 | 100 | 100 | 100 | 100 | 100 | 100 | 100 |
| Viscosity (mPa·s) | | 5,000 | 4,500 | 4,500 | 3,500 | 3,500 | 4,000 | 5,000 | 4,000 |
| Solid content (%) | | 20 | 20 | 20 | 20 | 20 | 20 | 20 | 20 |
| Weight average molecular weight of polymer (A) | | 1.6 M | 1.6 M | 1.4 M | 1.2 M | 1.2 M | 1.4 M | 1.65 M | 1.3 M |

* M: Million

FIG. 2: Table 3

| Composition of polymer (A) | | Preparation Example | | | | | | | | | | | | |
|---|---|---|---|---|---|---|---|---|---|---|---|---|---|
| | | 9 | 10 | 11 | 12 | 13 | 14 | 15 | 16 | 17 | 18 | 19 | 20 | 21 |
| Sample | | A-9 | A-10 | A-11 | A-12 | A-13 | A-14 | A-15 | A-16 | A-17 | A-18 | A-19 | A-20 | A-21 |
| Monomer (parts by weight) | BA | 80 | 99 | 88.7 | 99 | 95.5 | 80 | 80 | 95 | 90 | 80 | 73 | 95 | 99 |
| | MA | 16.8 | - | 10 | - | - | 14.3 | 10 | - | 9 | 18.4 | 25.8 | 3 | - |
| | HEA | 2.5 | - | - | - | - | - | - | - | - | 0.1 | - | - | - |
| | 4HBA | - | - | - | 1 | 4 | 5 | - | 5 | - | - | 0.2 | - | 1 |
| | HEAA | - | - | - | - | - | - | - | - | 0.8 | - | - | - | - |
| | AA | 0.7 | 1 | 0.3 | - | 0.5 | 0.7 | - | - | 0.2 | 1.5 | 1 | 2 | - |
| Total (parts by weight) | | 100 | 100 | 100 | 100 | 100 | 100 | 100 | 100 | 100 | 100 | 100 | 100 | 100 |
| Viscosity (mPa·s) | | 7,000 | 5,000 | 3,500 | 6,000 | 7,000 | 7,500 | 8,000 | 7,000 | 3,500 | 5,500 | 4,500 | 5,000 | 6,000 |
| Solid content (%) | | 20 | 20 | 20 | 20 | 20 | 20 | 20 | 20 | 20 | 20 | 20 | 20 | 20 |
| Weight average molecular weight of polymer (A) | | 1.7 M | 1.8 M | 1.3 M | 1.8 M | 1.7 M | 1.7 M | 1.8 M | 1.7 M | 1.2 M | 1.5 M | 1.4 M | 1.5 M | 1.8 M |

\* M: Million

FIG. 3: Table 6

| Composition (parts by weight) | | | Example | | | | | | | |
|---|---|---|---|---|---|---|---|---|---|---|
| | | | 1 | 2 | 3 | 4 | 5 | 6 | 7 | 8 |
| Polymer (A) | | | A-1 | A-2 | A-3 | A-4 | A-5 | A-6 | A-7 | A-8 |
| | | | 100 | 100 | 100 | 100 | 100 | 100 | 100 | 100 |
| Carbodiimide crosslinker (B) | | B-1 | - | 0.1 | - | 5 | 1 | - | 1 | - |
| | | B-2 | 1 | - | 0.2 | - | - | 0.3 | - | 0.3 |
| Group IV coupling agent (C) | | C-1 | - | - | - | 0.1 | - | - | - | - |
| | | C-2 | 0.02 | - | - | - | - | - | - | - |
| | | C-3 | - | 0.1 | - | - | - | 0.07 | - | 0.1 |
| | | C-4 | - | - | 0.20 | - | - | - | - | - |
| | | C-5 | - | - | - | - | 0.05 | - | 0.2 | - |
| Isocyanate crosslinker (D) | | D-1 | 1 | 0.5 | 0.15 | - | - | 1 | - | 1 |
| Silane coupling agent (E) | | E-1 | - | - | - | 0.1 | 0.1 | 0.1 | - | 0.1 |
| | | E-2 | 0.1 | 0.3 | 0.2 | - | - | - | 0.1 | - |
| Additional crosslinker (F) | | F-1 | - | - | - | - | - | - | - | 0.02 |
| | | F-2 | - | - | - | - | - | - | 0.01 | - |
| Concentration of adhesive composition (wt%) | | | 17 | 17 | 17 | 17 | 17 | 17 | 17 | 17 |
| Viscosity of adhesive composition (mPa·s) | Immediately after preparation | | 4,500 | 4,000 | 4,000 | 3,000 | 3,000 | 3,500 | 4,500 | 3,500 |
| | After 12 hours | | 4,500 | 3,900 | 4,000 | 3,100 | 2,900 | 3,500 | 4,600 | 3,600 |
| Gel fraction of adhesive composition (%) | After 0.5 days | | 82 | 76 | 86 | 87 | 88 | 80 | 87 | 79 |
| | After 7 days | | 80 | 78 | 84 | 88 | 88 | 81 | 86 | 78 |
| Properties | Metal corrosion suppression and prevention properties | | ○ | ○ | ○ | ○ | ○ | ○ | ○ | ○ |
| | Light leakage resistance | | | | | ○ | ○ | | ○ | |
| | Durability | | ○ | ○ | ○ | ○ | ○ | ○ | ○ | ○ |
| | Adhesive strength (N/25 mm) | | 5 | 3 | 6 | 3 | 3 | 3 | 4 | 3 |
| | Adhesion to substrate | | ○ | ○ | ○ | ○ | ○ | ○ | ○ | ○ |
| | Adherend contamination resistance | | ○ | ○ | ○ | ○ | ○ | ○ | ○ | ○ |
| | Low-temperature stability | | ○ | ○ | ○ | ○ | ○ | ○ | ○ | ○ |
| | Reworkability | | ○ | ○ | ○ | ○ | ○ | ○ | ○ | ○ |

FIG. 4: Table 7

| Composition (parts by weight) | | Comparative Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Polymer (A) | | A-9 | A-10 | A-11 | A-12 | A-13 | A-14 | A-15 | A-16 | A-17 | A-18 | A-19 | A-20 | A-21 |
| | | 100 | 100 | 100 | 100 | 100 | 100 | 100 | 100 | 100 | 100 | 100 | 100 | 100 |
| Carbodiimide crosslinker (B) | B-1 | | 0.1 | | | | 2.5 | | | | | 1.0 | | 1 |
| | B-2 | | | | | | | | | 0.01 | 6.0 | | 0.2 | |
| | B-3 | 0.3 | | | | | | | | | | | | |
| Group IV coupling agent (C) | C-1 | | | 0.1 | | | | | | | | | | |
| | C-2 | | | | 0.5 | | | | | | 0.1 | | | 0.5 |
| | C-3 | | | | | | | | | 0.3 | | | | |
| | C-4 | | | | | 0.5 | | | | | | 0.7 | 0.001 | |
| | C-5 | | | | | | | | | | | | | |
| | C-6 | | | | | | | | | | | | | |
| Isocyanate crosslinker (D) | D-1 | | 0.5 | | 0.4 | | | | | 0.4 | | | | 0.4 |
| | D-2 | | | | | 0.5 | | 0.05 | | | | | | |
| | D-3 | | | | | | | | | | | | | |
| | D-4 | | | | | | | | 1.0 | | | | | |
| Silane coupling agent (E) | E-1 | | 0.1 | 0.2 | | | | 0.1 | | 0.1 | 0.1 | 0.1 | | |
| | E-2 | 0.2 | | | | 0.1 | 0.1 | 0.3 | | | | | 0.2 | |
| Additional crosslinker (F) | F-3 | | | | | | | | 0.007 | | | | | |
| | F-4 | | | | | | | | 2.8 | | | | | |
| | F-5 | | | | | | | | | | | | | |
| Concentration of adhesive composition (wt%) | | 17 | 17 | 17 | 17 | 17 | - | 17 | 17 | 17 | 17 | 17 | 17 | - |
| Viscosity of adhesive composition (mPa·s) | Immediately after preparation | 6,500 | 4,500 | 3,000 | 5,500 | 6,500 | - | 7,500 | 5,500 | 3,000 | 5,500 | 4,000 | 4,500 | - |
| | After 12 hours | 7,000 | 4,500 | 2,900 | 5,400 | 6,600 | gelation | gelation | gelation | 3,000 | 6,000 | 4,700 | 4,500 | - |
| Gel fraction of adhesive composition (%) | After 0.5 days | 8 | 10 | 2 | 8 | 4 | - | 1 | 5 | 7 | 70 | 81 | 15 | - |
| | After 7 days | 75 | 79 | 78 | 76 | 80 | - | 73 | 78 | 77 | 74 | 80 | 76 | - |
| Properties | Metal corrosion suppression and prevention properties | ○ | ○ | ○ | ○ | ○ | - | ○ | ○ | ○ | ○ | ○ | ○ | - |
| | Light leakage resistance | × | × | × | × | × | - | × | × | × | × | × | × | - |
| | Durability | × | × | × | × | × | - | × | × | × | × | × | × | - |
| | Adhesive strength (N/25mm) | 34 | 30 | 28 | 23 | 32 | - | 36 | 31 | 26 | 5 | 10 | 17 | - |
| | Adhesion to substrate | × | × | × | × | × | - | × | × | × | ○ | × | × | - |
| | Adherend contamination resistance | × | × | × | × | × | - | × | × | × | ○ | × | × | - |
| | Low-temperature stability | × | × | × | × | × | - | × | × | × | ○ | × | × | - |
| | Reworkability | × | × | × | × | × | - | × | × | × | ○ | × | × | - |

FIG. 5: Table 8

| Composition of polymer (A) | | Preparation Example |||||||| 
|---|---|---|---|---|---|---|---|---|---|
| | Sample | 22 | 23 | 24 | 25 | 26 | 27 | 28 | 29 |
| | | A-22 | A-23 | A-24 | A-25 | A-26 | A-27 | A-28 | A-29 |
| Monomer (parts by weight) | BA | 60 | 15.8 | 70 | 40 | 60.8 | 5 | 87 | 33 |
| | 2EHA | 30.5 | 80 | 19 | 55 | 38 | 92.5 | - | 60 |
| | MA | - | - | 10 | - | - | - | - | 5 |
| | VAc | 2.5 | - | - | - | - | - | 4.9 | - |
| | HEA | - | - | - | - | 0.2 | - | - | - |
| | 4HBA | - | 0.7 | - | - | - | 0.5 | - | - |
| | HEAA | - | - | 0.5 | - | - | - | 0.1 | - |
| | AM | - | 0.5 | - | - | - | - | - | - |
| | AA | 7 | 3 | 0.5 | 5 | 1 | 2 | 8 | 2 |
| Total (parts by weight) | | 100 | 100 | 100 | 100 | 100 | 100 | 100 | 100 |
| Viscosity (mPa·s) | | 4,000 | 1,000 | 6,500 | 3,000 | 4,000 | 1,500 | 5,000 | 2,500 |
| Solid content (%) | | 35 | 35 | 35 | 35 | 35 | 35 | 35 | 35 |
| Weight average molecular weight of polymer (A) | | 0.75 M | 0.35 M | 0.9 M | 0.65 M | 0.7 M | 0.4 M | 0.3 M | 0.2 M |

* M: Million

FIG. 6: Table 9

| Composition of polymer (A) | | 30 | 31 | 32 | 33 | 34 | 35 | 36 | 37 | 38 | 39 | 40 | 41 | 42 | 43 |
|---|---|---|---|---|---|---|---|---|---|---|---|---|---|---|---|
| Sample | | A-30 | A-31 | A-32 | A-33 | A-34 | A-35 | A-36 | A-37 | A-38 | A-39 | A-40 | A-41 | A-42 | A-43 |
| Monomer (parts by weight) | BA | 80 | 94 | 88.7 | 99 | - | 80 | 80 | 36.5 | - | 90 | - | 73 | 95 | 99 |
| | 2EHA | - | - | - | - | 95.5 | - | 10 | 60 | 95 | - | 80 | - | 3 | - |
| | MA | 16.8 | - | 10 | - | - | 14.3 | - | - | - | 9 | 18.4 | 25.8 | - | - |
| | VAc | - | 5 | - | - | - | - | - | - | - | - | - | - | - | - |
| | HEA | 2.5 | - | - | - | - | 5 | 10 | 3 | 5 | - | 0.1 | - | - | - |
| | 4HBA | - | - | - | 1 | 4 | - | - | - | - | - | - | 0.2 | - | 1 |
| | HEAA | - | - | 1 | - | - | - | - | - | - | 0.8 | - | - | - | - |
| | AM | - | - | - | - | - | - | - | 0.5 | - | - | - | - | - | - |
| | AA | 0.7 | 1 | 0.3 | - | 0.5 | 0.7 | - | - | - | 0.2 | 1.5 | 1 | 2 | - |
| Total (parts by weight) | | 100 | 100 | 100 | 100 | 100 | 100 | 100 | 100 | 100 | 100 | 100 | 100 | 100 | 100 |
| Viscosity (mPa·s) | | 3,500 | 4,000 | 3,500 | 4,000 | 1,500 | 4,000 | 4,000 | 2,500 | 1,500 | 3,500 | 2,000 | 4,500 | 4,000 | 4,000 |
| Solid content (%) | | 35 | 35 | 35 | 35 | 35 | 35 | 35 | 35 | 35 | 35 | 35 | 35 | 35 | 35 |
| Weight average molecular weight of polymer (A) | | 0.9 M | 0.7 M | 0.9 M | 0.9 M | 0.4 M | 0.85 M | 0.8 M | 0.5 M | 0.4 M | 0.9 M | 0.4 M | 0.85 M | 0.85 M | 0.9 M |

FIG. 7: Table 12

| Composition (parts by weight) | | | Example | | | | | | | |
|---|---|---|---|---|---|---|---|---|---|---|
| | | | 9 | 10 | 11 | 12 | 13 | 14 | 15 | 16 |
| Polymer (A) | | | A-22 | A-23 | A-24 | A-25 | A-26 | A-27 | A-28 | A-29 |
| | | | 100 | 100 | 100 | 100 | 100 | 100 | 100 | 100 |
| Carbodiimide crosslinker (B) | | B-1 | 0.4 | 1 | | 4 | | | 5 | |
| | | B-2 | | | 0.1 | | 1 | 2 | | 3 |
| Group IV coupling agent (C) | | C-1 | 0.05 | | | | | | | |
| | | C-2 | | | 0.3 | | | | | |
| | | C-3 | | 0.02 | | 0.1 | 0.2 | | 0.05 | 0.2 |
| | | C-4 | | | | | | 0.07 | | 0.1 |
| | | C-5 | | | | | | | | |
| Isocyanate crosslinker (D) | | D-2 | | 1 | | | | | | |
| | | D-5 | 0.2 | | | | | 3 | | |
| Additional crosslinker (F) | | F-1 | | | | | | | | 0.02 |
| | | F-2 | | | | | | | 0.01 | |
| Concentration of adhesive composition (wt%) | | | 32 | 32 | 32 | 32 | 32 | 32 | 32 | 32 |
| Viscosity of adhesive composition (mPa·s) | Immediately after preparation | | 3,500 | 500 | 6,000 | 2,500 | 3,500 | 1,000 | 4,500 | 2,000 |
| | After 12 hours | | 3,700 | 500 | 6,200 | 2,600 | 3,600 | 1,100 | 4,500 | 1,900 |
| Gel fraction of adhesive composition (%) | After 0.5 days | | 89 | 94 | 84 | 90 | 87 | 96 | 88 | 90 |
| | After 7 days | | 92 | 95 | 88 | 92 | 89 | 97 | 89 | 91 |
| Properties | Metal corrosion suppression and prevention properties | | ○ | ○ | ○ | ○ | ○ | ○ | ○ | ○ |
| | Adhesive strength (N/25 mm) | | 5 | 0.50 | 10 | 1 | 3 | 0.30 | 2 | 6 |
| | Adhesion to substrate | | ○ | ○ | ○ | ○ | ○ | ○ | ○ | ○ |
| | Adherend contamination resistance | | ○ | ○ | ○ | ○ | ○ | ○ | ○ | ○ |
| | Low-temperature stability | | ○ | ○ | ○ | ○ | ○ | ○ | ○ | ○ |
| | Transparency of adhesive layer | | ○ | ○ | ○ | ○ | ○ | ○ | ○ | ○ |
| | Heat resistance | | ○ | ○ | ○ | ○ | ○ | ○ | ○ | ○ |
| | Humidity/heat resistance | | ○ | ○ | ○ | ○ | ○ | ○ | ○ | ○ |

FIG. 8: Table 13

| Composition (parts by weight) | | Comparative Example | | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 | 27 |
| Polymer (A) | | A-30 | A-31 | A-32 | A-33 | A-34 | A-35 | A-36 | A-37 | A-38 | A-39 | A-40 | A-41 | A-42 | A-43 |
| | | 100 | 100 | 100 | 100 | 100 | 100 | 100 | 100 | 100 | 100 | 100 | 100 | 100 | 100 |
| Carbodiimide crosslinker (B) | B-1 | | 1 | | | | 2.5 | | | | | 6.0 | 1 | | 2 |
| | B-2 | | | | | | | | | | 0.01 | | | 0.2 | |
| | B-3 | 3 | | | | | | | | | | | | | |
| | C-1 | | | | 0.5 | | | | | | | | | | 0.5 |
| | C-2 | | | | | | | | | | | | | | |
| Group IV coupling agent (C) | C-3 | | | 0.1 | | | | | | | 0.3 | 0.1 | | 0.001 | |
| | C-4 | | | | | 0.5 | | | | | | | | | |
| | C-5 | | | | | | | | | | | | 0.7 | | |
| | C-6 | | | | | | | | | | | | | | |
| | D-1 | | 0.5 | | 0.4 | 0.5 | | | | | 0.4 | | | | 0.4 |
| | D-2 | | | | | | | | | | | | | | |
| Isocyanate crosslinker (D) | D-3 | | | | | | | 0.05 | | | | | | | |
| | D-4 | | | | | | | | 1.0 | 1.0 | | | | | |
| | D-5 | | | | | | | | 0.5 | | | | | | |
| | F-3 | | | | | | | 0.3 | | 0.007 | | | | | |
| Additional crosslinker (F) | F-4 | | | | | | | | | 2.8 | | | | | |
| | F-5 | | | | | | | | | | | | | | |
| Concentration of adhesive composition (wt%) | | 32 | 32 | 32 | 32 | 32 | - | 32 | 32 | 32 | 32 | 32 | 32 | 32 | - |
| Viscosity of adhesive composition (mPa·s) | Immediately after preparation | 3,000 | 3,500 | 3,000 | 3,500 | 1,000 | - | 3,500 | 2,000 | 1,000 | 3,000 | 1,500 | 4,000 | 3,500 | - |
| | After 12 hours | 3,100 | 3,700 | 3,000 | 3,600 | 1,200 | - | gelation | gelation | gelation | 3,000 | 3,500 | 4,200 | 3,500 | - |
| Gel fraction of adhesive composition (%) | After 0.5 days | 8 | 10 | 0 | 8 | 4 | - | 1 | 3 | 5 | 7 | 89 | 92 | 15 | - |
| | After 7 days | 88 | 92 | 0 | 78 | 77 | - | 73 | 95 | 78 | 86 | 91 | 93 | 76 | - |
| Properties | Metal corrosion suppression and prevention properties | ○ | ○ | ○ | ○ | ○ | - | ○ | ○ | ○ | ○ | ○ | ○ | ○ | - |
| | Adhesive strength (N/25mm) | 34 | 30 | 28 | 23 | 32 | - | 36 | 19 | 31 | 26 | 5 | 10 | 21 | - |
| | Adhesion to substrate | × | × | × | × | × | - | × | × | × | × | ○ | ○ | × | - |
| | Adherend contamination resistance | × | × | × | × | × | - | × | × | × | × | ○ | ○ | × | - |
| | Low-temperature stability | × | × | × | × | × | - | × | × | × | × | ○ | ○ | × | - |
| | Transparency of adhesive layer | × | × | × | × | × | - | × | × | × | × | × | × | ○ | - |
| | Heat resistance | × | × | × | × | × | - | × | × | × | × | × | × | × | - |
| | Humidity/heat resistance | × | × | × | × | × | - | × | × | × | × | × | × | × | - |

ADHESIVE COMPOSITION, ADHESIVE LAYER, OPTICAL MEMBER, AND ADHESIVE SHEET

BACKGROUND

1. Field

Embodiments relate to an adhesive composition, an adhesive layer, an optical member, and an adhesive sheet.

2. Description of the Related Art

Recently, flat panel displays (FPDs), such as liquid crystal displays (LCDs), plasma display panels (PDPs), and organic electroluminescent (EL) displays, have been increasingly used. Thus, an improvement in workability and productivity of adhesives used for FPDs may be desirable.

SUMMARY

Embodiments are directed to an adhesive composition, an adhesive layer, an optical member, and an adhesive sheet.

The embodiments may be realized by providing an adhesive composition including 100 parts by weight of a (meth)acrylic copolymer, the (meth)acrylic copolymer having a weight average molecular weight of about 100,000 to about 2,000,000 g/mol; about 0.05 to about 5 parts by weight of a carbodiimide crosslinker; and about 0.01 to about 0.3 parts by weight of an organic group-containing compound, the organic group-containing compound including at least one selected from the group of titanium, zirconium, and hafnium.

The (meth)acrylic copolymer may be prepared from a monomer mixture including about 0.1 to about 9 parts by weight of a carboxyl group-containing monomer, 0 to about 1 part by weight of a hydroxyl group-containing (meth)acrylic monomer, and about 90 to about 99.9 parts by weight of a (meth)acrylic acid ester monomer, a total amount of the carboxyl group-containing monomer, the hydroxyl group-containing (meth)acrylic monomer, and the (meth)acrylic acid ester monomer being 100 parts by weight.

The adhesive composition may further include about 0.05 to about 5 parts by weight of an isocyanate crosslinker.

The adhesive composition may further include a silane coupling agent.

The adhesive composition may further include an imidazole compound represented by Formula 1:

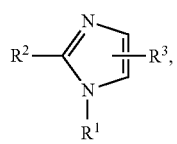

[Formula 1]

wherein $R^1$, $R^2$, and $R^3$ are each independently a hydrogen atom, a halogen atom, or a substituted or unsubstituted C1 to C10 linear or branched alkyl group.

The imidazole compound may be present in the composition an amount of about 0.008 to about 0.2 parts by weight.

The embodiments may also be realized by providing an adhesive layer having a 7-day gel fraction that is within about ±5% of a 0.5-day gel fraction, the 7-day gel fraction being measured after storage under conditions of about 23° C. and about 50% RH for about 7 days, and the 0.5-day gel fraction being measured after storage under conditions of about 23° C. and about 50% RH for about 0.5 days.

The adhesive layer may be prepared from an adhesive composition including 100 parts by weight of a (meth)acrylic copolymer, about 0.05 to about 5 parts by weight of a carbodiimide crosslinker, and about 0.01 to about 0.3 parts by weight of an organic group-containing compound, the organic group-containing compound including at least one selected from the group of titanium, zirconium, and hafnium.

The adhesive composition may have a viscosity (v1) 12 hours after preparation that is less than about 10% greater than a viscosity (v0) immediately after preparation.

The embodiments may also be realized by providing an optical member including an adhesive layer prepared from the adhesive composition according to an embodiment.

The (meth)acrylic copolymer may have a weight average molecular weight of about 1,000,000 to about 1,800,000 g/mol, and the adhesive layer may have an adhesive strength of about 0.5 to about 9 N/25 mm according to JIS Z0237.

The embodiments may also be realized by providing an optical member including the adhesive layer according to an embodiment.

The adhesive layer may have an adhesive strength of about 0.5 to about 9 N/25 mm according to HS Z0237.

The embodiments may also be realized by providing an adhesive sheet including an adhesive layer prepared from the adhesive composition according to an embodiment.

The (meth)acrylic copolymer may have a weight average molecular weight of about 100,000 to about 1,000,000 g/mol, and the adhesive layer may have an adhesive strength of about 0.05 to about 20 N/25 mm according to JIS Z0237.

The embodiments may also be realized by providing an adhesive sheet including the adhesive layer according to an embodiment.

The adhesive layer may have an adhesive strength of about 0.05 to about 20 N/25 mm according to JIS Z0237.

BRIEF DESCRIPTION OF THE DRAWINGS

Features will become apparent to those of ordinary skill in the art by describing in detail exemplary embodiments with reference to the attached drawings, in which:

FIGS. 1-8 illustrate Tables 2, 3, 6-9, 12, and 13, respectively.

DETAILED DESCRIPTION

Korean Patent Application No. 10-2011-0103771 filed on Oct. 11, 2011, in the Korean Intellectual Property Office, and Japanese Patent Application No. 2011-121076, filed on May 30, 2011, in the Japanese Intellectual Property Office, both entitled: "Adhesive Composition, Optical Member and Adhesive Sheet," are incorporated by reference herein in their entireties.

According to an embodiment, an adhesive composition may include 100 parts by weight of a (meth)acrylic copolymer (A) (having a weight average molecular weight of about 100,000 to about 2,000,000 g/mol); about 0.05 to about 5 parts by weight of a carbodiimide crosslinker (B); and about 0.01 to about 0.3 parts by weight of an organic group-containing compound (C), the organic group-containing compound including at least one selected from the group of titanium, zirconium, and hafnium.

In an implementation, the (meth)acrylic copolymer (A) may have a weight average molecular weight of about 100,000 to about 2,000,000 g/mol. In an implementation, the (meth)acrylic copolymer may be prepared from a monomer mixture including, e.g., about 0.1 to about 9 parts by weight of a carboxyl group containing monomer (a-1), 0 to about 1 part by weight of a hydroxyl group containing (meth)acrylic monomer (a-2), and about 90 to about 99.9 parts by weight of a (meth)acrylic acid ester monomer (a-3). In an implementation, a total amount of the carboxyl group containing monomer, the hydroxyl group containing (meth)acrylic monomer and (meth)acrylic acid ester monomer is 100 parts by weight.

According to an embodiment, the adhesive composition may employ a specific (meth)acrylic copolymer, may include a carbodiimide crosslinker as a crosslinker, and may include an organic compound containing at least one selected from the group of titanium, zirconium, and hafnium.

When the carbodiimide crosslinker and the organic compound containing at least one selected from the group of titanium, zirconium and, hafnium are used together with the specific (meth)acrylic copolymer, the adhesive composition may have a long pot life and may facilitate cross-linking (curing) of an adhesive layer within a short aging time after adhesive processing, without adversely affecting adhesive properties, thereby substantially improving workability and productivity.

Further, an adhesive layer prepared from the adhesive composition according to an embodiment may be used as an adhesive for an optical member. For example, the adhesive layer may have suitable adhesive strength and adhesion to a substrate, excellent metal corrosion suppression and prevention properties, light leakage resistance, durability, adherend contamination resistance, low-temperature stability, and reworkability.

In addition, an adhesive layer prepared from the adhesive composition according to an embodiment may be used as an adhesive for an adhesive sheet. The adhesive layer may have suitable adhesive strength or adhesion to a substrate and may exhibit excellent metal corrosion suppression and prevention properties, adherend contamination resistance, low-temperature stability, transparency, heat resistance, and humidity/heat resistance.

Hereinafter, components of the adhesive composition according to an embodiment will be described in more detail.

As used herein, the term "(meth)acrylate" may collectively refer to both acrylate and methacrylate. Further, a (meth) compound may collectively refer to both a compound and a (meth)-containing compound, e.g., (meth)acrylic acid. For example, "(meth)acryl" includes both acryl and methacryl, "(meth)acrylate" includes both acrylate and methacrylate, and "(meth)acrylic acid" includes both acrylic acid and methacrylic acid.

(Meth)acrylic Copolymer

The (meth)acrylic copolymer (hereinafter, also referred to as "component A") may be prepared from a monomer mixture that includes monomers selected from (a-1) about 0.1 to about 9 parts by weight of a carboxyl group containing monomer, (a-2) 0 to about 1 part by weight of a hydroxyl group containing (meth)acrylic monomer, and (a-3) about 90 to about 99.9 parts by weight of a (meth)acrylic acid ester monomer. In an implementation, a total amount of the carboxyl group containing monomer, the hydroxyl group containing (meth)acrylic monomer, and the (meth)acrylic acid ester monomer may be 100 parts by weight. The (meth)acrylic copolymer may have a weight average molecular weight of about 100,000 to about 2,000,000 g/mol.

(a-1) Carboxyl Group Containing Monomer

The carboxyl group containing monomer (hereinafter, also referred to as "component (a-1)") is an unsaturated monomer having at least one carboxyl group in a molecular structure thereof. Examples of the carboxyl group containing monomer may include (meth)acrylic acid, maleic acid, maleic anhydride, fumaric acid, fumaric anhydride, crotonic acid, itaconic acid, itaconic anhydride, myristoleic acid, palmitoleic acid, and oleic acid. The carboxyl group containing monomer may be used alone or in combination of two or more thereof.

In an implementation, the carboxyl group containing monomer may include, e.g., (meth)acrylic acid, maleic acid, maleic anhydride, fumaric acid, fumaric anhydride, crotonic acid, itaconic acid, and/or itaconic anhydride. In an implementation, the carboxyl group containing monomer may include, e.g., (meth)acrylic acid.

The carboxyl group containing monomer may be included in the monomer mixture in an amount of about 0.1 to about 9 parts by weight. Within this range, suitable crosslinking points may be formed by reaction of the carboxyl group and the carbodiimide crosslinker (B), thereby providing excellent properties (in terms of flexibility) of the adhesive composition as well as light leakage resistance and durability of an adhesive layer.

(a-2) Hydroxyl Group Containing (Meth)acrylic Monomer

The hydroxyl group containing (meth)acrylic monomer (hereinafter, also referred to as "component (a-2)") is an acrylic monomer having a hydroxyl group in a molecular structure thereof. Examples of the hydroxyl group containing (meth)acrylic monomer may include 2-hydroxyethyl (meth)acrylate, 4-hydroxybutyl(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxypropyl(meth)acrylate, 2-hydroxybutyl(meth)acrylate, 2-hydroxy-3-phenyloxypropyl(meth)acrylate, 4-hydroxycyclohexyl(meth)acrylate, N-2-hydroxyethyl(meth)acrylamide, and cyclohexane dimethanol monoacrylate. In an implementation, the hydroxyl group containing (meth)acrylic monomer may include compounds obtained by addition reaction of a glycidyl group containing compound, such as alkyl glycidyl ether, allyl glycidyl ether, and glycidyl(meth)acrylate, with (meth)acrylic acid. The hydroxyl group containing (meth) acrylic monomers may be used alone or in combination of two or more thereof.

In an implementation, the hydroxyl group containing (meth)acrylic monomer may include, e.g., 2-hydroxyethyl (meth)acrylate, 4-hydroxybutyl(meth)acrylate, N-2-hydroxyethyl(meth)acrylamide, and/or cyclohexane dimethanol monoacrylate. In an implementation, the hydroxyl group containing (meth)acrylic monomer may include, e.g., 2-hydroxyethyl(meth)acrylate, 4-hydroxybutyl(meth)acrylate, and/or N-2-hydroxyethyl(meth)acrylamide.

The hydroxyl group containing (meth)acrylic monomer may be included in the monomer mixture in an amount of 0 to about 1 part by weight. When included in an amount of up to about 1 part by weight, suitable crosslinking points may be formed by reaction of the hydroxyl group and the carbodiimide crosslinker (B), thereby providing excellent properties (in terms of flexibility) of the adhesive composition, without deteriorating light leakage resistance and durability of an adhesive layer.

(a-3) (Meth)acrylic Acid Ester Monomer

The (meth)acrylic acid ester monomer (hereinafter, also referred to as "component (a-3)") is an ester of (meth)acrylic acid having no, i.e., being free of, hydroxyl group in a molecular structure thereof. Examples of the (meth)acrylic acid ester monomer may include methyl(meth)acrylate, ethyl(meth)acrylate, propyl(meth)acrylate, isopropyl(meth)acrylate, n-butyl(meth)acrylate, isobutyl(meth)acrylate, tert-butyl(meth)acrylate, isoamyl(meth)acrylate, n-hexyl(meth)acrylate, n-heptyl(meth)acrylate, n-octyl(meth)acrylate, tert-octyl(meth)acrylate, 2-ethylhexyl(meth)acrylate, decyl(meth)acrylate, isodecyl(meth)acrylate, tridecyl(meth)acrylate, stearyl(meth)acrylate, isostearyl(meth)acrylate, phenyl(meth)acrylate, benzyl(meth)acrylate, dodecyl(meth)acrylate, tetrahydrofurfuryl(meth)acrylate, cyclohexyl(meth)acrylate, 4-n-butylcyclohexyl(meth)acrylate, 2-ethylhexyl diglycol(meth)acrylate, butoxyethyl(meth)acrylate, butoxymethyl(meth)acrylate, 3-methoxybutyl(meth)acrylate, 2-(2-methoxyethoxy)ethyl(meth)acrylate, 2-(2-butoxyethoxy)ethyl(meth)acrylate, 4-butylphenyl(meth)acrylate, phenyl(meth)acrylate, 2,4,5-tetramethyl phenyl(meth)acrylate, phenoxymethyl(meth)acrylate, phenoxyethyl(meth)acrylate, polyethylene oxide monoalkyl ether(meth)acrylate, polypropylene oxide monoalkyl ether(meth)acrylate, trifluoroethyl(meth)acrylate, pentadecafluorooxyethyl(meth)acrylate, 2-chloroethyl(meth)acrylate, 2,3-dibromopropyl(meth)acrylate, and tribromophenyl(meth)acrylate. The (meth)acrylic acid ester monomers may be used alone or in combination of two or more thereof.

In an implementation, the (meth)acrylic acid ester monomer may include, e.g., methyl(meth)acrylate, ethyl(meth)acrylate, n-butyl(meth)acrylate, and/or 2-ethylhexyl(meth)acrylate. In an implementation, the (meth)acrylic acid ester monomer may include, e.g., methyl(meth)acrylate, n-butyl(meth)acrylate, and/or 2-ethylhexyl(meth)acrylate.

The (meth)acrylic acid ester monomer (a-3) may be included in the monomer mixture in an amount of about 90 to about 99.9 parts by weight. Within this range, suitable crosslinking points may be formed by reaction with the carbodiimide crosslinker (B), thereby providing excellent properties in terms of thermal resistance and adhesion.

The (meth)acrylic copolymer (A) may be prepared by any suitable method, e.g., solution polymerization, emulsion polymerization, suspension polymerization, reverse-phase suspension polymerization, thin-film polymerization, and spray polymerization, which use polymerization initiators. Polymerization may be conducted by thermal insulation polymerization, temperature control polymerization, and isothermal polymerization. In addition to a method of using a polymerization initiator to initiate polymerization, irradiation, electromagnetic radiation, and UV radiation may be used. For example, solution polymerization using a polymerization initiator may be used because the initiator allows for easy adjustment of the molecular weight without increasing impurities.

For example, the (meth)acrylic copolymer may be produced by adding about 0.01 to about 0.50 parts by weight of a polymerization initiator to about 100 parts by weight of the total amount of the monomers (e.g., the monomer mixture), and using ethyl acetate, toluene, or methyl ethyl ketone as a solvent, followed by reaction under a nitrogen atmosphere at about 60 to about 90° C. for about 3 to about 10 hours. Examples of the polymerization initiator may include azo compounds, such as azobisisobutyronitrile (AIBN), 2-2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; and inorganic peroxides, such as hydrogen peroxide, ammonium persulfate, potassium persulfate, and sodium persulfate. The initiators may be used alone or in combination of two or more thereof.

The copolymer may further include other, additional monomers copolymerizable with the monomers (a-1) to (a-3). Examples of the other monomers may include an epoxy group containing acrylic monomer, such as glycidyl (meth)acrylate and methyl glycidyl(meth)acrylate; an amino group containing acrylic monomer, such as dimethylaminoethyl(meth)acrylate, diethylaminoethyl(meth)acrylate, N-tert-butylaminoethyl(meth)acrylate, and methacryloxyethyl trimethylammonium chloride (meth)acrylate; an amide group containing acrylic monomer, such as (meth)acrylamide, N-methylol(meth)acrylamide, N-methoxymethyl(meth)acrylamide, and N,N-methylene bis(meth)acrylamide; a phosphate group containing acrylic monomer, such as 2-methacryloyloxyethyl diphenyl phosphate (meth)acrylate, trimethacryloyloxyethyl phosphate (meth)acrylate, and triacryloyloxyethyl phosphate (meth)acrylate; a sulfonic acid group containing acrylic monomer, such as sodium sulfopropyl(meth)acrylate, sodium-2-sulfoethyl(meth)acrylate, and sodium-2-acrylamido-2-methylpropane sulfonate; a urethane group containing acrylic monomer, such as urethane (meth)acrylate; a phenyl group containing acrylic vinyl monomer, such as p-tert-butylphenyl(meth)acrylate and o-biphenyl(meth)acrylate; a silane group containing vinyl monomer, such as 2-acetoacetoxyethyl(meth)acrylate, vinyl trimethoxysilane, vinyl triethoxysilane, vinyl tris(β-methoxyethyl)silane, vinyl triacetylsilane, and methacryloyloxypropyltrimethoxysilane; and styrene, chlorostyrene, α-methylstyrene, vinyl toluene, vinyl chloride, vinyl acetate, vinyl propionate, acrylonitrile, and vinyl pyridine. The other monomers may be used alone or in combination of two or more thereof.

In an implementation, the other monomer may preferably include, e.g., (meth)acrylamide, glycidyl(meth)acrylate, dimethylaminoethyl(meth)acrylate, 2-acetoacetoxyethyl (meth)acrylate, and/or vinyl acetate. In an implementation, the other monomer may preferably include, e.g., (meth)acrylamide and/or vinyl acetate.

The other monomer may be included in the monomer mixture in an amount of about 0.1 to about 10 parts by weight, e.g., about 0.2 to about 7 parts by weight or about 0.3 to about 6 parts by weight, based on 100 parts by weight of the total amount of the monomers (a-1) to (a-3).

The (meth)acrylic copolymer (A) (prepared by copolymerization of the above monomers) may have a weight average molecular weight Mw of about 100,000 to about 2,000,000 g/mol. Maintaining the weight average molecular weight at about 100,000 g/mol or greater may help ensure sufficient heat resistance. Maintaining the weight average molecular weight at about 2,000,000 g/mol or less may help prevent a decrease in adhesion and tack. The weight average molecular weight may be based on a polystyrene standard measured by the method described below.

In an implementation, a total amount of the monomers (a-1), (a-2), and (a-3) in the monomer mixture may be 100 parts by weight.

The (meth)acrylic copolymer (A) may be used alone or in a combination of at least two polymers.

(B) Carbodiimide Crosslinker

The adhesive composition may include the carbodiimide crosslinker (hereinafter, also referred to as "component (B)") in addition to the copolymer (A). The carbodiimide crosslinker may react with and may be coupled with a hydroxyl group and/or a carboxyl group of the (meth)acrylic copolymer (A), thereby forming a cross-linked structure.

The carbodiimide crosslinker may include any suitable carbodiimide crosslinker. For example, a compound having at least two carbodiimide groups (—N═C═N—) may be used, and any suitable polycarbodiimide may be used.

In an implementation, the carbodiimide compound may include a high-molecular weight polycarbodiimide prepared by a decarbonation condensation reaction of diisocyanate in the presence of a carbodiimide catalyst.

Examples of the carbodiimide compound may include compounds obtained by decarbonation condensation reaction of the following diisocyanates.

The diisocyanates may include, e.g., 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and/or tetramethyl xylene diisocyanate, which may be used alone or in combination of two or more thereof.

The carbodiimide catalyst may include, e.g., phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, and 3-phospholene isomers thereof.

The high-molecular-weight polycarbodiimides may be obtained by synthesis or from commercially available products. Examples of commercially available products of the component (B) may include CARBODILITE® (Nisshinbo Chemical Inc.), specifically CARBODILITE® V-01, V-03, V-05, V-07 and V09, which have excellent compatibility with organic solvents.

The carbodiimide crosslinker (B) may be present in the adhesive composition in an amount of about 0.05 to about 5 parts by weight, based on 100 parts by weight of the (meth)acrylic copolymer (A). Within this range, a suitably cross-linked structure may be formed, thereby realizing excellent heat resistance. For example, maintaining the amount of carbodiimide crosslinker (B) at about 0.05 parts by weight or greater may help ensure that a sufficiently cross-linked structure is formed, thereby ensuring good heat resistance. Maintaining the amount of carbodiimide crosslinker (B) at about 5 parts by weight or less may help prevent excessive cross-linking, thereby preventing a decrease in tack and ensuring the ability of the adhesive composition to deal with contraction of a polarizer plate over time and ensuring light leakage resistance and durability.

The carbodiimide crosslinker (B) may be used alone or in combination of two or more thereof.

(C) Organic Group-Containing Compound Including at Least One Selected from the Group of Titanium, Zirconium, and Hafnium The adhesive composition may include the organic group-containing compound including at least one of titanium, zirconium, and hafnium (hereinafter, also referred to as "component (C)" or "organic compound"). With such a component (C), a curing reaction may be promoted without deteriorating adhesion, thereby enhancing productivity. According to an embodiment, as the organic compound containing at least one of titanium, zirconium, and hafnium (hereinafter, also referred to as a "metal-containing organic compound" or a "group IV-containing organic compound") may include a suitable organic group-containing compound that includes a titanium, zirconium, or hafnium atom and that is able to enhance the effect of promoting the curing reaction. In an implementation, a coupling agent as disclosed in Japanese Patent Publication No. 2003-519631, Japanese Patent Publication No. 2005-108499, and Japanese Unexamined Patent Publication No. 2009-292731 may be suitably selected as the organic group-containing compound. In an implementation, a suitable commercially available product may be used as the organic group-containing compound.

The organic group-containing compound may effectively enhance the effect of promoting the curing reaction with respect to the adhesive composition when the adhesive composition includes the metal-containing organic compound. For example, the organic group-containing compound may include compounds obtained from Azinomoto Fine-Techno Co., Ltd., and represented by the following formulae:

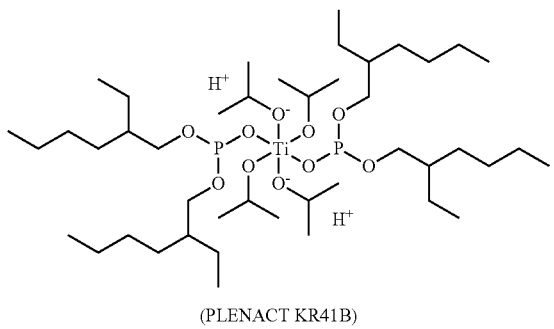

(PLENACT KR41B)

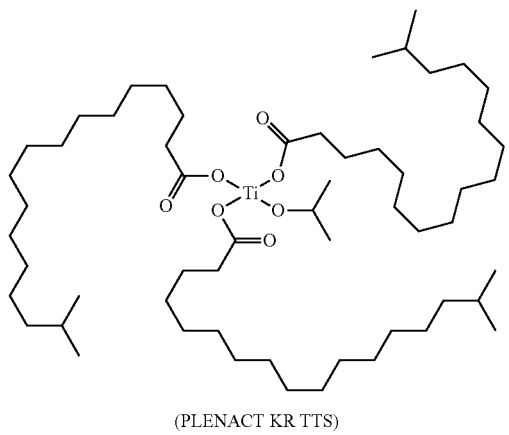

(PLENACT KR TTS)

-continued
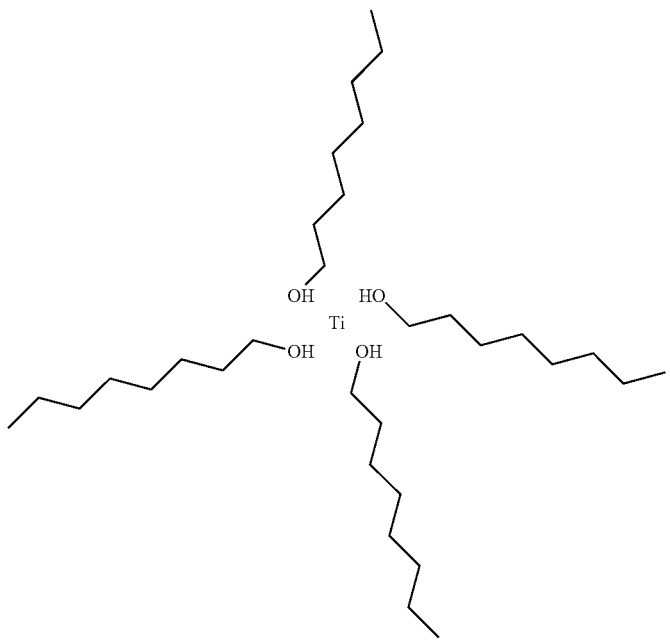
(PLENACT KR46B)
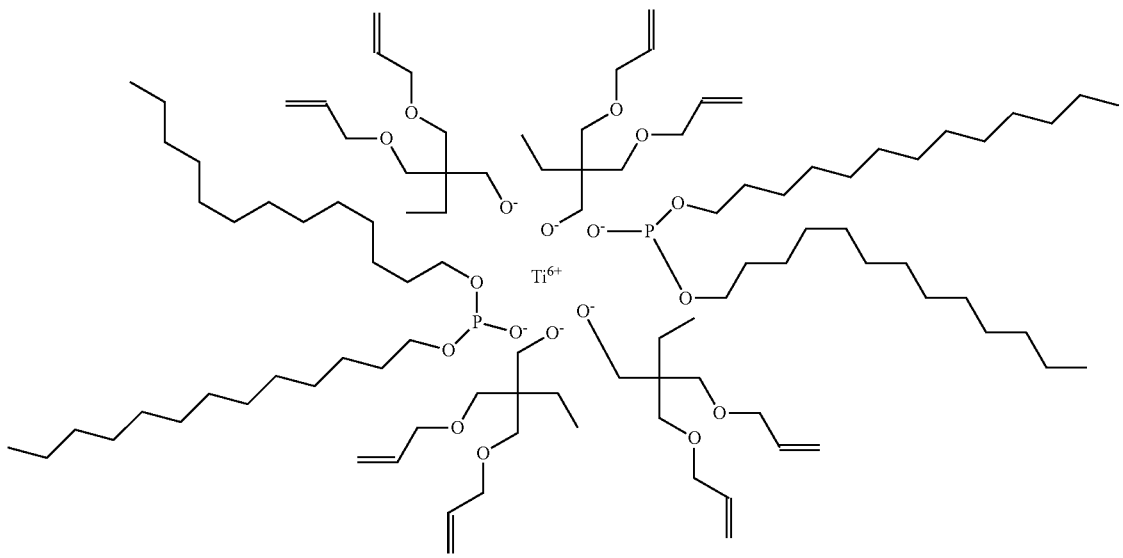
(PLENACT KR55)

In an implementation, the adhesive composition may include an organic group-containing compound obtained from Kenrich Petrochemicals Co., Ltd., and represented by the following formula:

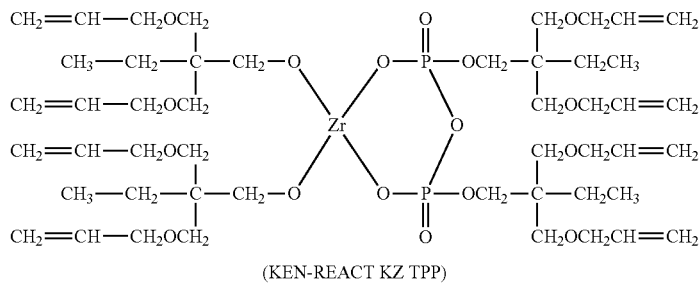

(KEN-REACT KZ TPP)

Further, without being bound by theory, it is believed that titanium, zirconium, or hafnium may accelerate extraction of hydrogen from the carboxyl group, thereby facilitating a crosslinking reaction between the carboxyl group and the carbodiimide crosslinker. Further, it is believed that the metal-containing organic compound may be particularly effective because a number and molecular structure (balance such as size or molecular weight) of ligands of titanium, zirconium, or hafnium may accelerate extraction of hydrogen in the carboxyl group. In an implementation, in consideration of the effect of hydrogen extraction, the metal-containing organic compound may be free of sulfur and/or amine.

The component (C) may be present in the composition in an amount of about 0.01 to about 0.3 parts by weight, based on 100 parts by weight of the (meth)acrylic copolymer (A). Within this range, the metal-containing organic compound may provide an increased crosslinking rate without deteriorating adhesive properties of the adhesive composition. In an implementation, the group IV-containing organic compound, i.e., the organic compound containing at least one of titanium, zirconium, and hafnium may be added to adhesives or adhesive compositions as a curing accelerator of the carbodiimide crosslinker, thereby providing significant effects. Maintaining the amount of the component (C) at about 0.01 parts by weight or greater may help ensure sufficient curing acceleration, thereby helping to ensure that a long aging time is not required after adhesive processing. Maintaining the amount of the component (C) at about 0.3 parts by weight or less may help prevent deterioration of light leakage resistance, durability, adhesion to an adherend, low-temperature stability, and reworkability of the adhesive composition. Maintaining the amount of the component (C) at about 0.3 parts by weight or less may also help prevent a deterioration in adherend contamination resistance of the adhesive composition.

The component (C) may be used alone or in combination of two or more thereof.

(D) Isocyanate Crosslinker

The adhesive composition may further include an isocyanate crosslinker (hereinafter, also referred to as "component (D)"). When the isocyanate crosslinker (D) is added, an adhesive layer prepared from the adhesive composition may exhibit improved durability. Furthermore, the adhesive layer prepared from the adhesive composition may have significantly improved light resistance.

Any suitable isocyanate crosslinker may be used as the isocyanate crosslinker. Examples of the isocyanate crosslinker (D) may include aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), toluidine diisocyanate (TODI), and 1,5-naphthalene diisocyanate (NDI); aliphatic diisocyanates, such as hexamethylene diisocyanate (HDI), trimethylhexamethylene diisocyanate (TMHDI), lysine diisocyanate, and norbornane diisocyanate (NBDI); alicyclic diisocyanates, such as trans-cyclohexane-1,4-diisocyanate, isophorone diisocyanate (IPDI), H6-XDI (hydrogen added XDI), and H12-MDI (hydrogen added MDI); carbodiimide-modified diisocyanates of the foregoing diisocyanates; isocyanurate-modified diisocyanates thereof; and the like.

In addition, adducts of the foregoing isocyanate compounds and polyol compounds, such as trimethylolpropane, or biurets and isocyanurates of the isocyanate compounds may be suitably used.

The isocyanate crosslinker (D) may be obtained by synthesis or from commercially available products. Examples of commercially available products of the isocyanate crosslinker (D) may include Coronate® L, Coronate® HL, Coronate® 2030, Coronate® 2031 (all available from Nippon Polyurethane Industry Co., Ltd.); Takenate® D-102, Takenate® D-110N, Takenate® D-200, Takenate® D-202 (all available from Mitsui Chemicals Inc.); Duranate™ 24A-100, Duranate™ TPA-100, Duranate™ TKA-100, Duranate™ P301-75E, Duranate™ E402-90T, Duranate™ E405-80T, Duranate™ TSE-100, Duranate™ D-101, and Duranate™ D-201 (all available from Asahi Kasei Chemical Corporation); Smidule® N75, N3200 and N3300 (all available from Urethane Co., Ltd.); and the like.

In an implementation, the isocyanate crosslinker may preferably include, e.g., Coronate® L, Coronate® HL, Coronate® HX, Takenate® D-110N, Duranate™ 24A-100, and/or Duranate™ TPA-100. In an implementation, the isocyanate crosslinker may preferably include, e.g., Coronate® L, Coronate® HX, and/or Duranate™ 24A-100.

The isocyanate crosslinker (D) may be used alone or in a combination of two or more thereof.

When used, the isocyanate crosslinker (D) may be included in the composition in an amount of about 0.05 to about 5 parts by weight, based on 100 parts by weight of the (meth)acrylic copolymer (A). Within this range, the adhesive composition may have suitable durability. In an implementation, the isocyanate crosslinker may be present in an amount of, e.g., about 0.08 to about 4 parts by weight or about 0.1 to about 3 parts by weight.

(E) Silane Coupling Agent

The adhesive composition may further include a silane coupling agent (hereinafter, also referred to as "component (E)"). When the silane coupling agent is added, reactivity may be improved, and mechanical strength and adhesive strength of cross-linked products may be enhanced. Any suitable silane coupling agent may be used. Examples of the silane coupling agent may include methyltrimethoxysilane, dimethyldimethoxysilane, trimethylmethoxysilane, n-propyltrimethoxysilane, ethyltrimethoxysilane, diethyldiethoxysilane, n-butyltrimethoxysilane, n-hexyltriethoxysilane, n-octyltrimethoxysilane, phenyltrimethoxysilane, diphenyldimethoxysilane, cyclohexylmethyldimethoxysilane, vinyltrichlorosilane, vinyltrimethoxysilane, vinyltriethoxysilane, vinyl tris(β-methoxyethoxy)silane, β-(3,4-epoxycyclohexyl)ethyltrimethoxysilane, γ-glycidoxyprolylmethyldiethoxysilane, γ-glycidoxypropyltrimethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, γ-mercaptopropylmethyldimethoxysilane, bis[3-(triethoxysilyl)propyl]tetrasulfide, and γ-isocyanatopropyltriethoxysilane. In an implementation, a compound having a hydrolytic silyl group that is obtained by reaction of a silane coupling agent having a functional group, such as an epoxy group (glycidoxy group), an amino group, a mercapto group, and a (meth)acryloyl group, a silane coupling agent having a functional group reactive to the foregoing functional groups, other coupling agents, and polyisocyanate at a certain ratio with respect to each functional group may be used.

An oligomeric silane coupling agent may be used as the silane coupling agent (E). The oligomeric silane coupling agent may have a —Si—O—Si— structure formed by condensation of two or more silane compounds, each of which has at least an alkoxy group. The —Si—O—Si— structure in which at least one alkoxy group bonded to one of the silicon atoms may be formed. The oligomeric silane coupling agent may have an organic functional group.

Examples of the organic functional group may include vinyl, epoxy, styryl, (meth)acryloyl, methacryloxy, acryloxy, amino, ureido, chloropropyl, mercapto, and polysulfide groups. In an implementation, the organic function group may include, e.g., epoxy, mercapto, and (meth)acryloyl groups. In an implementation, the organic function group may include, e.g., epoxy and mercapto groups. Use of such organic functional groups may help simultaneously attain improved durability and low tack of an adhesive layer formed from the composition.

The oligomeric silane coupling agent may be an oligomer that has two silicon atoms (i.e. a dimer) to about 100 silicon atoms per molecule, e.g., an average degree of polymerization of about 2 to about 100. The oligomeric silane coupling agent may become viscous with increasing average degree of polymerization. Accordingly, the oligomeric silane coupling agent may be in a paste or solid form, and may be difficult to handle. In an implementation, the average degree of polymerization of the oligomeric silane coupling agent may be, e.g., about 2 to about 80 or about 3 to about 50.

The organic functional group included in the oligomeric silane coupling agent may be bonded to a silicon atom via a suitable linker. Examples of such linkers may include alkylene groups, such as methylene, ethylene, trimethylene, hexamethylene, and decamethylene groups; divalent hydrocarbon groups interrupted by an aromatic ring, such as methylphenylethyl; and divalent aliphatic groups interrupted by an oxygen atom, such as methoxymethyl, methoxyethyl, and methoxypropyl groups. When the organic functional group is an epoxy group, a functional group may be formed between two adjacent carbon atoms forming a ring.

The oligomeric silane coupling agent may be a co-oligomer obtained by partial co-hydrolysis and polycondensation of a tetraalkoxysilane and a silane compound represented by Formula 2:

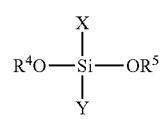

[Formula 2]

In Formula 2, $R^4$ and $R^5$ may each independently represent an alkyl or phenyl group, X may represent an organic group having a mercapto, epoxy, or (meth)acryloyloxy group, and Y may represent an alkyl, alkoxy, phenyl, phenoxy, aralkyl, or aralkyloxy group.

In Formula 2, $R^4$ and $R^5$ may each be independent of each other, e.g., a C1 to C10 alkyl group. In an implementation, $R^4$ and $R^5$ may each independently be a methyl or ethyl group.

Examples of the organic functional group represented by X may include mercaptomethyl, 3-mercaptopropyl, 6-mercaptohexyl, 10-mercaptodecyl, 2-(4-mercaptomethylphenyl)ethyl, glycidoxymethyl, 3-glycidoxypropyl, 2-(3,4-epoxycyclohexyl)ethyl, acryloyloxymethyl, 3-acryloyloxypropyl, methacryloyloxymethyl, and 3-methacryloyloxypropyl groups.

Y may represent a C1 to C10 alkyl or alkoxy group or a C7 to C10 aralkyl or aralkyloxy group.

Examples of the functional group-containing silane compound represented by Formula 2 may include mercaptomethyltrimethoxysilane, 3-mercaptopropyltrimethoxysilane, 3-mercaptopropyltriethoxysilane, 2-(4-mercaptomethylphenyl)ethyltrimethoxysilane, 6-mercaptohexyltrimethoxysilane, 10-mercaptodecyltrimethoxysilane, 3-mercaptopropylmethyldimethoxysilane, 3-mercaptopropylmethyldiethoxysilane, glycidoxymethyltrimethoxysilane, 3-glycidoxypropyltrimethoxysilane, 2-(3,4-epoxycyclohexyl)ethyltrimethoxysilane, 3-glycidoxypropylmethyldimethoxysilane, acryloyloxymethyltrimethoxysilane, 3-acryloyloxypropyltrimethoxysilane, 3-acryloyloxypropyltriethoxysilane, methacryloyloxymethyltrimethoxysilane, 3-methacryloyloxypropyltrimethoxysilane, 3-methacryloyloxypropyltriethoxysilane, 3-methacryloyloxypropyltributoxysilane, 3-acryloyloxypropylmethyldimethoxysilane, 3-methacryloyloxypropylmethyldimethoxysilane, and 3-methacryloyloxypropylmethyldiethoxysilane.

The tetraalkoxysilane (which may be prepared by partial co-hydrolysis and polycondensation with the functional group-containing silane compound represented by Formula 2) may have four alkoxy groups bonded to each silicon atom. Each of the alkoxy groups may have 1 to 10 carbon atoms. The four alkoxy groups bonded to the silicon atom may be the same or different. In terms of ease of production and purchase, a compound having the same alkoxy groups bonded to a silicon atom may be used, e.g., tetramethoxysilane, tetraethoxysilane, tetrapropoxysilane, and tetrabutoxysilane.

The oligomeric silane coupling agent may be prepared by partial co-hydrolysis and polycondensation of the functional group-containing silane compound represented by Formula 2 and the tetraalkoxysilane. In this case, the alkoxysilyl or phenoxysilyl groups as —$OR^4$ or —$OR^5$ bonded to the silicon atom may be partially hydrolyzed to form a silanol group; and the alkoxysilyl groups of the tetraalkoxysilane may be partially hydrolyzed to form a silanol group. Condensation of two silanol groups may yield the oligomeric silane coupling agent. Use of the oligomer may be desirable due to its tendency to help prevent the adhesive composition from being dispersed during coating and drying.

Examples of the monomeric oligomeric silane coupling agent may be as follows.

Mercaptomethyl group-containing cooligomers may include, e.g., mercaptomethyltrimethoxysilane-tetramethoxysilane, mercaptomethyltrimethoxysilane-tetraethoxysilane, mercaptomethyltriethoxysilane-tetramethoxysilane, and mercaptomethyltriethoxysilane-tetraethoxysilane cooligomers.

Mercaptopropyl group-containing cooligomers may include, e.g., 3-mercaptopropyltrimethoxysilane-tetramethoxysilane, 3-mercaptopropyltrimethoxysilane-tetraethoxysilane, 3-mercaptopropyltriethoxysilane-tetramethoxysilane, and 3-mercaptopropyltriethoxysilane-tetraethoxysilane cooligomers.

Glycidoxymethyl group-containing cooligomers may include, e.g., glycidoxymethyltrimethoxysilane-tetramethoxysilane, glycidoxymethyltrimethoxysilane-tetraethoxysilane, glycidoxymethyltriethoxysilane-tetramethoxysilane, and glycidoxymethyltriethoxysilane-tetraethoxysilane cooligomers.

Glycidoxypropyl group-containing cooligomers may include, e.g., 3-glycidoxypropyltrimethoxysilane-tetramethoxysilane, 3-glycidoxypropyltrimethoxysilane-tetraethoxysilane, 3-glycidoxypropyltriethoxysilane-tetramethoxysilane, and 3-glycidoxypropyltriethoxysilane-tetraethoxysilane cooligomers.

Methacryloyloxypropyl group-containing cooligomers may include, e.g., acryloyloxypropyl group-containing cooligomers, such as 3-acryloyloxypropyltrimethoxysilane-tetramethoxysilane, 3-acryloyloxypropyltrimethoxysilane-tetraethoxysilane, 3-acryloyloxypropyltriethoxysilane-tetramethoxysilane, 3-acryloyloxypropyltriethoxysilane-tetraethoxysilane, 3-acryloyloxypropylmethyldimethoxysilane-tetramethoxysilane, 3-acryloyloxypropylmethyldimethoxysilane-tetraethoxysilane, 3-acryloyloxypropylmethyldiethoxysilane-tetramethoxysilane, and 3-acryloyloxypropylmethyldiethoxysilane-tetraethoxysilane cooligomers, 3-methacryloyloxypropyltrimethoxysilane-tetramethoxysilane, 3-methacryloyloxypropyltrimethoxysilane-tetraethoxysilane, 3-methacryloyloxypropyltriethoxysilane-tetramethoxysilane, 3-methacryloyloxypropyltriethoxysilane-tetraethoxysilane, 3-methacryloyloxypropylmethyldimethoxysilane-tetramethoxysilane, 3-methacryloyloxypropylmethyldimethoxysilane-tetraethoxysilane, 3-methacryloyloxypropylmethyldiethoxysilane-tetramethoxysilane, and 3-methacryloyloxypropylmethyldiethoxysilane-tetraethoxysilane cooligomers.

The silane coupling agent may be obtained by synthesis or from commercially available products. Examples of commercially available products applicable for use as the silane coupling agent may include KBM-303, KBM-403, KBE-402, KBE-403, KBE-502, KBE-503, KBM-5103, KBM-573, KBM-802, KBM-803, KBE-846, KBE-9007 (all available from Shin-Etsu Chemical Co., Ltd.); X-41-1805, X-41-1810, X-41-1053, and X-41-1058 (Trade names, all available from Shin-Etsu Chemical Co. Ltd). X-41-1805 is an oligomeric silane coupling agent having mercapto, methoxy and ethoxy groups, X-41-1810 is an oligomeric silane coupling agent having mercapto, methyl and methoxy groups, X-41-1053 is an oligomeric silane coupling agent having epoxy, methoxy and ethoxy groups, and X-41-1058 is an oligomeric silane coupling agent having epoxy, methyl and methoxy groups.

In an implementation, KBM-303, KBM-403, KBE-402, KBE-403, KBM-5103, KBM-573, KBM-802, KBM-803, KBE-846, KBE-9007, X-41-1805, and/or X-41-1810 may preferably be used. In an implementation, KBM-403 and/or X-41-1810 may preferably be used. The silane coupling agents may be used alone or in combination thereof.

An amount of silane coupling agent is not particularly limited. In an implementation, the silane coupling agent (E) may be included in the composition in an amount of about 0.03 to about 1 part by weight, e.g., about 0.05 to about 0.5 parts by weight or about 0.1 to about 0.3 parts by weight, based on 100 parts by weight of the (meth)acrylic copolymer (A). Within this range, excellent heat resistance and adhesion may be obtained.

(F) Additives

The adhesive composition may further include and additive, e.g., an imidazole compound. The imidazole compound may function as a cross-linking (curing) accelerator with respect to the carbodiimide crosslinker. The adhesive composition including both the carbodiimide crosslinker and the imidazole compound may achieve practical adhesive properties within a short aging time, thereby providing excellent productivity.

The imidazole compound may be represented by the following Formula 1.

[Formula 1]

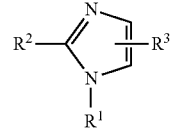

In Formula 1, $R^1$, $R^2$, and $R^3$ may each independently represent a hydrogen atom, a halogen atom, or a substituted or unsubstituted C1 to C10 linear or branched alkyl group.

Examples of the halogen atom may include a fluorine atom, a chlorine atom, a bromine atom, and an iodine atom.

Examples of the C1 to C10 linear or branched alkyl group may include a methyl group, an ethyl group, an n-propyl group, an isopropyl group, an n-butyl group, an isobutyl group, a sec-butyl group, a tert-butyl group, an n-pentyl group, an isoamyl group, a tert-pentyl group, a neopentyl group, an n-hexyl group, a 3-methylpentane-2-yl group, a 3-methylpentane-3-yl group, a 4-methylpentyl group, a 4-methylpentane-2-yl group, a 1,3-dimethylbutyl group, a 3,3-dimethylbutyl group, 3,3-dimethylbutane-2-yl group, an n-heptyl group, a 1-methylhexyl group, a 3-methylhexyl group, a 4-methylhexyl group, a 5-methylhexyl group, a 1-ethylpentyl group, a 1-(n-propyl)butyl group, a 1,1-dimethylpentyl group, a 1,4-dimethylpentyl group, a 1,1-diethylpropyl group, a 1,3,3-trimethylbutyl group, a 1-ethyl-2,2-dimethylpropyl group, an n-octyl group, a 2-ethylhexyl group, a 2-methylhexane-2-yl group, a 2,4-dimethylpentane-3-yl group, a 1,1-dimethylpentane-1-yl group, a 2,2-dimethylhexane-3-yl group, a 2,3-dimethylhexane-2-yl group, a 2,5-dimethylhexane-2-yl group, a 2,5-dimethylhexane-2-yl group, a 3,4-dimethylhexane-3-yl group, a 3,5-dimethylhexane-3-yl group, a 1-methylheptyl group, a 2-methylheptyl group, a 5-methylheptyl group, a 2-methylheptane-2-yl group, a 3-methylheptane-3-yl group, a 4-methylheptane-3-yl group, a 4-methylheptane-4-yl group, a 1-ethylhexyl group, a 2-ethylhexyl group, a 1-propylpentyl group, a 2-propylpentyl group, a 1,1-dimethylhexyl group, a 1,4-dimethylhexyl group, a 1,5-dimethylhexyl group, a 1-ethyl-1-methylpentyl group, a 1-ethyl-4-methylpentyl group, a 1,1,4-trimethylpentyl group, a 2,4,4-trimethylpentyl group, a 1-isopropyl-1,2-dimethylpropyl group, a 1,1,3,3-tetramethylbutyl group, an n-nonyl group, a 1-methyloctyl group, a 6-methyloctyl group, a 1-ethylheptyl group, a 1-(n-butyl)pentyl group, a 4-methyl-1-(n-propyl)pentyl group, a 1,5,5-trimethylhexyl group, a 1,1,5-trimethylhexyl group, a 2-methyloctane-3-yl group, an n-decyl group, a 1-methylnoyl group, a 1-ethyloctyl group, a 1-(n-butyl)hexyl group, a 1,1-dimethyloctyl group, a 3,7-dimethyloctyl group, and the like.

The alkyl group may be substituted by a substituent.

Examples of the substituent may include a halogen atom, such as a fluorine atom, a chlorine atom, a bromine atom, and an iodine atom; an alkyl group, such as a methyl group, an ethyl group, a tert-butyl group, and a dodecyl group; an aryl group, such as a phenyl group, a p-tolyl group, a xylyl group, a cumenyl group, a naphthyl group, an anthryl group, and a phenanthryl group; an alkoxy group, such as a methoxy group, an ethoxy group, and a tert-butoxy group; an aryloxy group, such as a phenoxy group and a p-tolyloxy group; an alkoxycarbonyl group, such as a methoxycarbonyl group, a butoxycarbonyl group, an octyloxycarbonyl group, and a phenoxycarbonyl group; an acyloxy group, such as an acetoxy group, a propionyloxy group, a methacryloyloxy group, and a benzoyloxy group; an acyl group, such as an acetyl group, a benzoyl group, an isobutylyl group, an acryloyl group, a methacryloyl group, a methoxalyl group; an alkylamino group, such as a methylamino group and a cyclohexylamino group; a dialkylamino group, such as a dimethylamino group, a diethylamino group, a morpholino group, and a piperidino group; an arylamino group, such as a phenylamino group and a p-tolylamino group; a hydroxyl group, a carboxyl group, a formyl group, an amino group, a nitro group, a cyano group, a trifluoromethyl group, a trichloromethyl group, and the like.

Examples of the imidazole compound may include imidazole, 1-methylimidazole, 2-methylimidazole, 4-methylimidazole, 1-ethylimidazole, 2-ethylimidazole, 4-ethylimidazole, 1-propylimidazole, 2-propylimidazole, 4-propylimidazole, 1-butylimidazole, 2-butylimidazole, 4-butylimidazole, 1-pentylimidazole, 2-pentylimidazole, 4-pentylimidazole, 1-hexylimidazole, 2-hexyl imidazole, 4-hexylimidazole, 1-heptylimidazole, 2-heptylimidazole, 4-heptylimidazole, 1-octylimidazole, 2-octylimidazole, 4-octylimidazole, 1-nonylimidazole, 2-nonylimidazole, 4-nonylimidazole, 1-decylimidazole, 2-decylimidazole, 4-decylimidazole, 1,2-dimethylimidazole, 1,2-diethylimidazole, 1-ethyl-2-methylimidazole, 2-ethyl-4-methylimidazole, 1,4-dimethyl imidazole, 1,5-dimethylimidazole, 1,2,4-trimethylimidazole, 1,4-dimethyl-2-ethylimidazole, 2-fluoroimidazole, 4-fluoroimidazole, 2-bromoimidazole, 4-bromoimidazole, 2-iodoimidazole, 4-iodoimidazole, and the like.

In an implementation, a compound in which at least one of $R^1$, $R^2$, and $R^3$ is a substituted or unsubstituted C1 to C10 linear or branched alkyl group may be used, e.g., 1-methyl imidazole, 1-ethylimidazole, 1-propylimidazole, 1-butylimidazole, 1,2-dimethylimidazole, and 2-ethyl-4-methylimidazole, which may help enhance productivity and lower costs.

The imidazole compound may be included in the composition in an amount of about 0.008 to about 0.2 parts by weight, based on 100 parts by weight of the component (A). Within this range, sufficient curing acceleration effects may be obtained and an aging time may be reduced after adhesive processing. In an implementation, the imidazole compound may be present in an amount of about 0.009 to about 0.18 parts by weight or about 0.01 to about 0.15 parts by weight.

The imidazole compound may be used alone or in combination of two or more thereof. The imidazole compound may be obtained by synthesis or from commercially available products.

The adhesive composition may further include other additives. Examples of the additives may include curing accelerators, ionic liquids, lithium salts, inorganic fillers, softeners, antioxidants, anti-aging agents, stabilizers, tackifier resins, reforming resins (polyol resin, phenolic resin, acrylic resin, polyester resin, polyolefin resin, epoxy resin, epoxylated poly-butadiene resin, etc.), leveling agents, anti-foaming agents, plasticizers, dyes, pigments (coloring and extender pigments), treatment agents, UV blocking agents, fluorescent whitening agents, dispersants, heat stabilizers, light stabilizers, UV absorbers, anti-static agents, lubricants, and solvents. Examples of the curing accelerator may include dibutyltin dilaurate, JCS-50 (Johoku Chemical Company Ltd.), and Formate TK-1 (Mitsui Chemicals Inc.). Examples of the ionic liquid may include materials having cations, such as phosphonium, pyridinium, pyrrolidinium, imidazolium, guanidinium, ammonium, isouronium, thiouronium, piperidium, pyrazolium, and sulfonium ions, and materials having anions, such as halides, nitrates, sulfates, phosphates, perchlorates, thiocyanate, thiosulfate, sulfites, tetrafluoroborate, hexafluorophosphate, formate, oxalate, acetate, trifluoroacetate, and alkyl sulfonate ions. Examples of the antioxidant may include dibutylhydroxytoluene (BHT), Irganox® 1010, Irganox® 1035FF, and Irganox® 565 (all available from BASF Japan Co., Ltd.). Examples of the tackifier resin may include rosins, such as rosin acid, polymerized rosin acid, and rosin acid esters, terpene resins, terpene phenolic resin, aromatic hydrocarbon resins, aliphatic saturated hydrocarbon resins, and petroleum resins. If the adhesive composition includes any of these additives, the additives may be included in an amount of about 0.1 to about 20 parts by weight, based on about 100 parts by weight of a total amount of the components (A) to (C).

The adhesive composition according to an embodiment may be prepared by mixing the above components at once or in order, or mixing some components first and then adding the remaining components, and stirring the components to a homogeneous mixture. For example, the adhesive composition may be prepared by heating or treating the components at about 20° C. to about 40° C., as desired, and stirring using a stirrer for about 5 minutes to about 5 hours until the mixture becomes uniform.

In an implementation, the adhesive composition may have a viscosity of about 300 to about 7,000 mPa s at about 25° C., immediately after preparation (within about 10 minutes after mixing the components for a predetermined time) in order to facilitate coating and control of the thickness of an adhesive layer to be formed of the adhesive composition. For example, when used to prepare adhesives for optical members, the adhesive composition may have a viscosity of about 2,000 to about 6,000 mPa s, e.g., about 2,500 to about 5,000 mPa s at about 25° C. immediately after preparation (within about 10 minutes after mixing the components for a predetermined time). When used to prepare adhesives for adhesive sheets, the adhesive composition may have a viscosity of about 350 to about 6,800 mPa s, e.g., about 400 to about 6,500 mPa s at about 25° C. immediately after preparation (within about 10 minutes after mixing the components for a predetermined time). The adhesive composition according to an embodiment may have an excellent pot life as excessive viscosity increase and/or gelation of the adhesive composition may be suppressed after preparation.

Pot life may be evaluated by comparing the viscosity of the composition immediately after preparation (of the adhesive composition) with the viscosity of the composition about 12 hours after preparation. For example, it may be desirable that the composition not be gelated about 12 hours after preparation. It may be desirable that the viscosity of the adhesive composition about 12 hours after preparation be increased by only about 30% or less, e.g., about 10% or less, of the viscosity of the composition immediately after preparation. Within this range, the adhesive composition may have excellent workability.

Herein, the expression "immediately after" may mean "within about 10 minutes." For example, "the viscosity of the adhesive composition immediately after preparation of the adhesive composition" may mean the viscosity of the adhesive composition measured within about 10 minutes after completion of preparation of the adhesive composition (after the components are mixed for a predetermine time).

An adhesive layer prepared from the adhesive composition according to an embodiment may be obtained by cross-linking the adhesive composition. In an implementation, although cross-linking of the adhesive composition may be performed after application of the adhesive composition to a target substrate, an adhesive layer formed by crosslinking the cross-linked adhesive composition may be transferred to a substrate. The adhesive composition may be cross-linked at about 70 to about 140° C. for about 1 to about 5 minutes.

The adhesive layer formed of or prepared from the adhesive composition may exhibit practical adhesive performance within a short aging time of about 0.5 days after adhesive processing (cross-linking). The practical adhesive performance of the adhesive layer may be evaluated by comparing a 0.5-day gel fraction (G0.5) of the adhesive layer (via or after storage at about 23° C. and about 50% RH for about 0.5 days after adhesive processing (cross-linking)) with a 7-day gel fraction (G7) of the adhesive layer (via or after storage at about 23° C. and about 50% RH for about 7 days after adhesive processing (cross-linking)). For example, the gel fraction (G7) after storage for about 7 days may be within the gel fraction (G0.5) after storage for about 0.5 days±5%. In an implementation, the gel fraction (G7) after storage for about 7 days may be within the gel fraction (G0.5) after storage for about 0.5 days±3%. Within this range, the adhesive composition may have considerably improved productivity. The gel fraction may be measured by a process described below.

The adhesive composition may be used to bond various materials, e.g. glass, plastic films, paper, metal foil, or the like.

The glass may include general inorganic glass. Examples of plastics for the plastic films may include polyvinyl chloride resins, polyvinylidene chloride, cellulose resins, acrylic resins, cycloolefin resins, amorphous polyolefin resins, polyethylene, polypropylene, polystyrene, ABS resins, polyamide, polyester, polycarbonate, polyurethane, polyvinyl alcohol, ethylene-vinyl acetate copolymers, and chlorinated polypropylene. The amorphous polyolefin resins include a polymer unit of a cyclic polyolefin, such as norbornene or multiple-ring norbornene monomers, and may be a copolymer of cyclic olefin and a chain-cyclic olefin.

Commercially available amorphous polyolefin resins may include ATON™ (JSR Co., Ltd.), ZEONEX® and ZEONR® (Nihon Zeon Co., Ltd.), APO® and APEL® (Mitsui Chemicals Inc.), and the like. The amorphous polyolefin resins may be formed into a film by any suitable method, e.g., solvent casting, melt extrusion, and the like. Further, examples of paper may include vellum paper, wood free paper, kraft paper, art coat paper, caster coat paper, bowl paper, artificial parchment, waterproof paper, glassine paper, and linerboard. An example of metal foil may include an aluminum foil.

The embodiments also provide optical members and adhesive sheets, which include an adhesive layer prepared from the adhesive composition according to an embodiment.

The adhesive composition according to an embodiment is effective in bonding of various adherends, and an adhesive layer prepared the adhesive composition of an embodiment may be suitably used, e.g., as an adhesive layer of an optical member or an adhesive sheet.

Hereinafter, uses of the adhesive composition according to an embodiment will be illustrated in detail as follows, without being limited thereto.

<Optical Member>

The adhesive composition according to an embodiment may be applied directly to one or opposite sides of an optical member to form an adhesive layer thereon. Alternatively, an adhesive layer, prepared in advance by depositing the adhesive composition on a release film, may be transferred to one or opposite sides of an optical member. For example, the embodiments provide an optical member including an adhesive layer prepared from the adhesive composition according to an embodiment.

Examples of the optical member may include a polarizer plate, a phase difference plate, an optical film for PDPs, a conductive film for touch panels, and the like. For example, the adhesive composition of an embodiment may exhibit excellent adhesion to a polarizer plate and glass. However, the embodiments are not limited thereto, and the adhesive composition may also be used to bond other materials.

When the adhesive composition is used to prepare an adhesive layer for an optical member, the component (A) in the composition may be prepared from a monomer mixture including (a-1) about 0.1 to about 9 parts by weight of the carboxyl group containing monomer, (a-2) 0 to about 1 part by weight of the hydroxyl group containing (meth)acrylic monomer, and (a-3) about 90 to about 99.9 parts by weight of the (meth)acrylic acid ester monomer, and may have a weight average molecular weight of about 1,000,000 to about 2,000,000 g/mol. Here, a total amount of the components (a-1), (a-2), and (a-3) in the monomer mixture may be 100 parts by weight.

In preparing component (A) of the adhesive composition (to prepare the adhesive layer for the optical member), the amount of component (a-1) in the monomer mixture may be about 0.1 to about 9 parts by weight, e.g., about 0.3 to about 5 parts by weight or about 0.5 to about 3 parts by weight.

In preparing component (A) of the adhesive composition (to prepare the adhesive layer for the optical member), the amount of component (a-2) in the monomer mixture may be about 0 to about 1 part by weight, e.g., about 0 to about 0.5 parts by weight or about 0 to about 0.3 parts by weight.

In preparing the component (A) of the adhesive composition (to prepare the adhesive layer for the optical member), the amount of component (a-3) in the monomer mixture may be about 90 to about 99.9 parts by weight, e.g., about 94.5 to about 99.7 parts by weight or about 96.7 to about 99.5 parts by weight.

A total amount of the components (a-1) and (a-2) in the monomer mixture used to prepare the component (A) of the adhesive composition (to prepare the adhesive layer for the optical member), may be about 0.1 to about 10 parts by weight, e.g., about 0.3 to about 5.5 parts by weight or about 0.5 to about 3.3 parts by weight.

The component (A) of the adhesive composition (to prepare the adhesive layer for the optical member), may have a weight average molecular weight of about 1,000,000 to about 1,800,000 g/mol, e.g., about 1,100,000 to about 1,700,000 g/mol.

The component (B) of the adhesive composition (to prepare the adhesive layer for the optical member), may be present in an amount of about 0.05 to about 5 parts by weight, e.g., about 0.1 to about 5 parts by weight, based on 100 parts by weight of the component (A).

The component (C) of the adhesive composition (to prepare the adhesive layer for the optical member), may be present in an amount of about 0.01 to about 0.3 parts by weight, e.g., about 0.02 to about 0.2 parts by weight, based on 100 parts by weight of the component (A). Within this range, the adhesive composition may have a long pot life to thereby provide excellent workability and may exhibit practical adhesive properties within a short aging time of about 0.5 days after adhesive processing, thereby considerably improving productivity.

Further, when included, the component (D) may be present in an amount of about 0.08 to about 4 parts by weight, e.g., about 0.1 to about 1 part by weight, based on 100 parts by weight of the component (A). Specific examples and amount of the imidazole compound are described above.

When used to prepare an adhesive layer for the optical member, the adhesive composition may further include the silane coupling agent (E). Specific examples and amount of the silane coupling agent (E) are described above.

The adhesive composition (for preparing the adhesive layer for the optical member) may be coated by any suitable method, e.g., various coating methods using a natural coater, a knife belt coater, a floating knife, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. Although adjusted based on materials and purposes, a thickness of the coated adhesive composition for preparing the optical member (thickness after drying) may be about 5 to about 35 μm, e.g., about 15 to about 30 μm.

When the adhesive composition is used to prepare the adhesive layer for the optical member, the adhesive layer may have a gel fraction of about 50 to about 95%, e.g., about 60 to about 92% or about 70 to about 90%, via storage for about 0.5 days at about 23° C. and about 50% RH after adhesive processing. Within this range, the optical member having the adhesive layer may facilitate punching or slitting.

In order to set the gel fraction within the above range, conditions may be suitably selected, e.g., by adjusting amounts of the respective components within the ranges as described above.

In the optical member, the adhesive layer may have an adhesive strength of about 0.5 to about 9 (N/25 mm), e.g., about 1 to about 6 (N/25 mm). Within this range of adhesive strength, favorable reworkability may be obtained. Herein, the adhesive strength may be measured according to a test method of pressure sensitive adhesive tapes and sheets as disclosed in JIS Z0237 (2000), specifically by the process described below.

The adhesive composition (for preparing the adhesive layer for the optical member) may have a long pot life to thereby provide excellent workability and may exhibit practical adhesive properties within a short aging time of about 0.5 days after adhesive processing, thereby considerably improving productivity. Further, the adhesive layer obtained from the adhesive composition may have suitable adhesive strength or suitable adhesion to a substrate, excellent metal corrosion suppression and prevention properties, light leakage resistance, durability, adherend contamination resistance, low-temperature stability, and reworkability.

<Adhesive Sheet>

The adhesive composition according to an embodiment may be formed into an adhesive layer through application to a substrate or separator and drying (crosslinking), thereby preparing an adhesive sheet in a sheet or tape shape. For example, the embodiments provide an adhesive sheet including an adhesive layer prepared from the adhesive composition according to an embodiment.

Examples of the substrate for the adhesive sheet may include plastic films, such as a polyester film including a polyethylene terephthalate (PET) film, a polypropylene film, and a cellophane film; plastics, such as polyurethane, ethylene-propylene terpolymers, or the like; and various thin materials such as rubber foam, paper, and aluminum foils. These substrates may be subjected to surface treatment, such as corona treatment, plasma treatment, and formation of an easy bonding layer, or have an antistatic layer on the surface thereof depending on materials. Further, examples of the separator may include the plastic films used for the substrate, which are subjected to surface treatment using silicon, fluorine, and long-chain alkyl peel-treatment agents, or a polypropylene film which is not subjected to surface treatment.

When the adhesive layer is formed on a substrate, the adhesive layer may be formed on one surface of the substrate (to prepare a one-sided adhesive sheet) or may be formed on each of both surfaces (to prepare a double-sided adhesive sheet). In the double-sided adhesive sheet, the adhesive composition according to an embodiment may be provided on only one surface of the substrate, thereby preparing a tape having different adhesives on opposite sides thereof. When the adhesive layer is formed on a separator, it may be used as the double-sided adhesive sheet.

When the adhesive composition is used to prepare an adhesive layer of an adhesive sheet, the component (A) of the composition may be prepared from a monomer mixture including (a-1) about 0.1 to about 9 parts by weight of the carboxyl group containing monomer, (a-2) 0 to about 1 part by weight of the hydroxyl group containing (meth)acrylic monomer, and (a-3) about 90 to about 99.9 parts by weight of the (meth)acrylic acid ester monomer, and may have a weight average molecular weight of about 100,000 to about 1,000,000 g/mol. Here, a total amount of the components (a-1), (a-2), and (a-3) in the monomer mixture may be 100 parts by weight.

In the monomer mixture used to prepare component (A) of the adhesive composition (to prepare the adhesive layer for the adhesive sheet), the amount of component (a-1) may be about 0.1 to about 9 parts by weight, e.g., about 0.3 to about 9 parts by weight or about 0.5 to about 8.5 parts by weight.

In the monomer mixture for preparing component (A) of the adhesive composition (to prepare the adhesive layer for the adhesive sheet), the amount of component (a-2) may be about 0 to about 1 part by weight, e.g., about 0 to about 0.8 parts by weight or about 0 to about 0.7 parts by weight.

In the monomer mixture for preparing component (A) of the adhesive composition (to prepare the adhesive layer for the adhesive sheet), the amount of component (a-3) may be about 90 to about 99.9 parts by weight, e.g., about 90.2 to about 99.7 parts by weight or about 90.5 to about 99.5 parts by weight.

A total amount of the components (a-1) and (a-2) in the monomer mixture used to prepare the component (A) of the adhesive composition (to prepare the adhesive layer for the adhesive sheet), may be about 0.1 to about 10 parts by weight, e.g., about 0.3 to about 9.8 parts by weight or about 0.5 to about 9.2 parts by weight.

The component (A) of the adhesive composition used to prepare the adhesive sheet may have a weight average molecular weight of about 100,000 to less than about 1,000,000 g/mol, e.g., about 200,000 to about 900,000 g/mol.

The component (B) of the adhesive composition (to prepare the adhesive layer for the adhesive sheet), may be present in the composition an amount of about 0.05 to about 5 parts by weight, e.g., about 0.1 to about 4 parts by weight, based on 100 parts by weight of the component (A).

The component (C) of the adhesive composition used to prepare the adhesive sheet may be present in the composition in an amount of about 0.01 to about 0.3 parts by weight, e.g., about 0.02 to about 0.3 parts by weight, based on 100 parts by weight of the component (A). Within this range, the adhesive composition used to prepare the adhesive sheet may have a long pot life to provide excellent workability and may exhibit practical adhesive properties within a short aging time of about 0.5 days after adhesive processing, thereby considerably improving productivity.

In an implementation, when used, the component (D) may be present in the composition in an amount of about 0.05 to about 5 parts by weight, e.g., about 0.1 to about 3 parts by weight, based on 100 parts by weight of the component (A). Specific examples and amount of the imidazole compound (component (D)) are described above.

In an implementation, the adhesive composition may not include the silane coupling agent (E) when used to prepare the adhesive sheet.

The adhesive composition used to prepare the adhesive sheet may be applied by any suitable method, e.g., various methods using a natural coater, a knife belt coater, a floating knife, roll coating, air-knife coating, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. For example, roll coating, gravure coating, reverse coating, roll brushing, spraying, air-knife coating, and die coating may be used. Although adjusted based on materials and purposes, a thickness of the applied adhesive composition for forming the adhesive sheet (e.g., a thickness of the adhesive layer: after drying) may be about 3 to about 200 µm, e.g., about 5 to about 100 µm.

When the adhesive composition is used to prepare the adhesive sheet, the adhesive layer may have a 0.5-day gel fraction of about 70 to about 100%, e.g., about 80 to about 99% or about 85 to about 98% (via or after storage for about 0.5 days at about 23° C. and about 50% RH after adhesive processing). Within this range, the adhesive sheet having the adhesive layer may facilitate punching or slitting. In order to set the gel fraction within the above range, conditions may be suitably selected, for example, by adjusting the amounts of the respective components within the ranges as described above.

In the adhesive sheet, the adhesive layer may have an adhesive strength of about 0.05 to about 20 (N/25 mm), e.g., about 0.1 to about 20 (N/25 mm). Within this range, the adhesive sheet may be applied to various adhesive sheets in a sheet or tape shape which need adhesive strength.

The adhesive composition used to prepare the adhesive sheet may have a long pot life to thereby provide excellent workability and may exhibit practical adhesive properties within a short aging time of about 0.5 days after adhesive processing, thereby considerably improving productivity. Further, the adhesive layer obtained from the adhesive composition may have suitable adhesive strength or adhesion to a substrate, excellent metal corrosion suppression and prevention properties, adherend contamination resistance, low-temperature stability, transparency, heat resistance, and humidity/heat resistance.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

In the following examples, the solid content and viscosity of the polymer solutions, the viscosity of the adhesive compositions, and the weight average molecular weight of the polymers (A) were measured as described below.

<Solid Content>

About 1 g of a polymer solution was precisely measured on a precisely weighed glass plate. The solution was dried at 105° C. for 1 hour and cooled to room temperature, and then a total mass of the glass plate and the remaining solid content were precisely measured. Defining the mass of the glass plate as X, the total mass of the glass plate and the polymer solution before drying as Y, and the total mass of the glass plate and the remaining solid content as Z, solid content was calculated by $$\text{Solid content (\%)} = \{(Z-X)/(Y-X)\} \times 100 \qquad [\text{Equation 1}]$$

<Viscosity>

The temperature of a polymer solution in a glass bottle was adjusted to about 25° C., and then viscosity was measured using a B-type viscometer. The viscosity of the adhesive composition was measured twice: immediately after preparation of the adhesive composition and 12 hours after preparation.

<Weight Average Molecular Weight>

The weight average molecular weight was measured by the following method under the following conditions illustrated in Table 1.

TABLE 1

| Equipment | Gel Permeation Chromatography (GPC, Device No. GPC-16) |
|---|---|
| Detector | Differential Refractive Index Detector (RI-8020, Sensitivity: 32, Tosoh Corporation) UV Absorbance Detector (Model 2487, Wavelength: 215 nm, Sensitivity: 0.2 AUFS, Waters Co., Ltd.)) |
| Column | Two TSKgel GMHXL, One G2500HXL (S/N M0052, M0051, N0010, φ7.8 mm × 30 cm, Tosoh Corporation) |
| Solvent | Tetrahydrofuran (Wako Junyaku Co., Ltd.) |
| Flow rate | 1.0 ml/min |
| Column temperature | 23° C. |
| Sample | Concentration: About 0.2% Dissolving: Smoothly stirred at room temperature Solubility: Dissolved (identified with the naked eye) Filtration: Filtered through a 0.45 μm filter |
| Input | 0.200 ml |
| Reference sample | Monodisperse polystyrene |
| Data processing | GPC data processing system |

Preparation Example 1

89.4 parts by weight of n-butyl acrylate (Nihon Shokubai, Co., Ltd.), 10 parts by weight of methyl acrylate (Nihon Shokubai, Co., Ltd.), 0.1 part by weight of 4-hydroxybutyl acrylate (Nippon Kasei, Co., Ltd.), 0.5 parts by weight of acrylic acid (Nihon Shokubai, Co., Ltd.), and 120 parts by weight of ethyl acetate were placed in a flask equipped with a reflux condenser and an agitator, and then were heated to 65° C. under a nitrogen atmosphere. Then, 0.04 parts by weight of azobisisobutyronitrile (AIBN) was added, followed by polymerization for 6 hours while maintaining the mixture at 65° C. After polymerization, the mixture was diluted with 280 parts by weight of ethyl acetate, thereby obtaining a solution of a polymer (A-1). The polymer solution (A-1) had a solid content of 20 wt % and a viscosity of 5,000 mPa s. Further, the obtained polymer (A-1) had a weight average molecular weight of less than 1,600,000 g/mol.

Preparation Examples 2~21

Solutions of polymers (A-2) to (A-21) were prepared by the same process as in Preparation Example 1 except that the monomers were mixed according to the compositions listed in Tables 2 and 3 of FIGS. 1 and 2. Then, the solid contents and the viscosities of the solutions of the polymers (A-2) to (A-21) and the weight average molecular weights of the polymers (A-2) to (A-21) were measured, and results are shown in Tables 2 and 3. In Tables 2 and 3, "BA" refers to butyl acrylate, "MA" refers to methyl acrylate, "HEA" refers to 2-hydroxyethyl acrylate, "4HBA" refers to 4-hydroxybutyl acrylate, "HEAA" refers to N-2-hydroxyethyl acrylamide and "AA" refers to acrylic acid.

TABLE 4

| BA | butyl acrylate |
|---|---|
| MA | methyl acrylate |

TABLE 4-continued

| HEA | 2-hydroxyethyl acrylate |
|---|---|
| 4HBA | 4-hydroxybutyl acrylate |
| HEAA | N-2-hydroxyethyl acrylamide |
| AA | acrylic acid |

Example 1

500 parts by weight of the polymer solution (100 parts by weight of the polymer in terms of solid content) obtained in Preparation Example 1, 1 part by weight of CARBODIL-ITE® V-09 (B-2, Nisshinbo Chemical Inc.) as a carbodiimide crosslinker (B), 0.02 parts by weight of PLENACT KR 55 (C-2, Azinomoto Fine-Techno Co., Ltd.) as a group IV-containing organic compound (C), 1 part by weight of Colonate® L (D-1, trimethylolpropane/tolylene diisocyanate trimer adduct, Nippon Polyurethane Industry Co., Ltd.) as an isocyanate crosslinker (D), and 0.1 parts by weight of KBM-403 (E-2, Shin-Etsu Chemical Co., Ltd.) as a silane coupling agent were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 90° C. for 3 minutes, thereby forming an adhesive layer (adhesive processing). Then, the adhesive layer was attached to a polarizer plate, thereby producing an adhesive layer-attached polarizer plate.

Examples 2~8 and Comparative Examples 1~13

Adhesive composition solutions and adhesive layer-attached polarizer plates were prepared in the same process as in Example 1 except that the polymers, carbodiimide crosslinkers, group IV-containing organic compounds, isocyanate crosslinkers, silane coupling agents, and other additives were used according to the compositions listed in Tables 6 and 7 of FIGS. 3 and 4. Details of carbodiimide crosslinkers B-1, B-2, and B-3, group IV-containing organic compounds C-1, C-2, C-3, C-4, C-5, and C-6, isocyanate crosslinkers D-1, D-2, D-3, and D-4, silane coupling agents E-1 and E-2, and other additives F-1, F-2, F-3, F-4, and F-5 are described in Table 5.

TABLE 5

B-1: CARBODILITE ® V-05 (Nisshinbo Chemical Inc.)
B-2: CARBODILITE ® V-09 (Nisshinbo Chemical Inc.)
B-3: CARBODILITE ® V-01 (Nisshinbo Chemical Inc.)
C-1: PLENACT ® KR TTS (Azinomoto Fine-Techno Co., Ltd.)
C-2: PLENACT ® KR 55 (Azinomoto Fine-Techno Co., Ltd.)
C-3: PLENACT ® KR 41B (Azinomoto Fine-Techno Co., Ltd.)
C-4: PLENACT ® KR 46B (Azinomoto Fine-Techno Co., Ltd.)
C-5: KEN-REACT ® KZ TPP (Kenrich Petrochemicals Co., Ltd.)
C-6: di-n-butoxytitan bis(acetonate) (Nacemtitan, Nippon chemicals Co., Ltd.)
D-1: trimethylolpropane/tolylene diisocyanate (Colonate L ®, Nippon Polyurethane Industry Co., Ltd.)
D-2: Colonate ® HX (Nippon Polyurethane Industry Co., Ltd.)
D-3: Smidule N-75 (Smika Byer Urethane Co., Ltd.)
D-4: Aquanate 210 (Nippon Polyurethane Industry Co., Ltd.)
E-1: Shin-etsu silicone X41-1810 (Shin-etsu Chemical Co., Ltd.)
E-2: 3-glycidoxypropylmethyldiethoxysilane (KBM-403, Shin-etsu Chemical Co., Ltd.)
F-1: 1-butylimidazole (Tokyo Kasei Kogyo Co., Ltd.)
F-2: 1,2-dimethylimidazole (Tokyo Kasei Kogyo Co., Ltd.)
F-3: Alumichelate ® A (Kawaken Fine Chemicals Co., Ltd.)

TABLE 5-continued

F-4: dibutyl tin dilaurate (Tokyo Kasei Kogyo Co., Ltd.)
F-5: acetylacetone (Tokyo Kasei Kogyo Co., Ltd.)

Physical properties of the adhesive layer-attached polarizer plates obtained according to Examples 1 to 8 and Comparative Examples 1 to 13 were evaluated as follows.

1. Gel Fraction

Instead of the adhesive layer-attached polarizer plates prepared in the Examples and Comparative Examples, each adhesive layer was deposited on a stripped polyester film and subjected to adhesive processing, followed by measurement of gel fraction after storage for 0.5 days and also after storage for 7 days at 23° C. and 50% RH. That is, about 0.1 g of the adhesive composition, left at 23° C. and 50% RH, was weighed and defined as $W_1$ (g). This composition was placed in a sample bottle, and about 30 g of ethyl acetate was added thereto and left for 24 hours. After a predetermined period of time, the contents of the bottle were filtered through a 200-mesh stainless steel mesh (weight: $W_2$ (g)). The mesh and the remaining materials were dried at 90° C. for 1 hour, and the total weight $W_3$ (g) was measured. The gel fraction was calculated by Equation 2 using the measured values:

$$\text{Gel fraction (\%)} = \{(W_3 - W_2)/W_1\} \times 100. \quad [\text{Equation 2}]$$

2. Metal Corrosion Suppression and Prevention Properties

The adhesive layer of each adhesive layer-attached polarizer plate, left at 23° C. and 50% RH for 0.5 days, was attached to aluminum foil and left at 60° C. and 90% RH for 2 days, followed by observation of corrosion. In Tables 6 and 7, no change is indicated by "O," and whitening is indicated by "X."

3. Light Leakage Resistance

Each adhesive layer-attached polarizer plate, left at 23° C. and 50% RH for 0.5 days, was cut into a 120 mm (MD direction of the polarizer plate)×60 mm piece and a 120 mm (TD direction of the polarizer plate)×60 mm piece. The respective pieces were attached to opposites sides of a glass substrate, overlapping each other, and subjected to autoclaving at 50° C. and 0.49 MPa (5 kg/cm²) for 20 minutes. Then, the glass substrate was left at 80° C. for 120 hours and 500 hours, followed by observation of appearance. In Tables 6 and 7, no light leakage after 120 hours and 500 hours is indicated by "⊚," no light leakage after 120 hours is indicated by "O," and light leakage is indicated by "X."

4. Durability

Each adhesive layer-attached polarizer plate, left at 23° C. and 50% RH for 7 days, was cut into a 120 mm (MD direction of the polarizer plate)×60 mm piece. Each piece was attached to a glass substrate and subjected to autoclaving at 50° C. and 0.49 MPa (5 kg/cm²) for 20 minutes. Then, the glass substrate was left at 100° C. and at 80° C. and 90% RH for 120 hours, followed by observation of appearance. In Tables 6 and 7, no occurrence of bubbles, damage, or peeling is indicated by "O," while occurrence of bubbles, damage, or peeling is indicated by "X."

5. Adhesive Strength

Each adhesive layer-attached polarizer plate, left at 23° C. and 50% RH for 0.5 days, was cut into a 25 mm wide piece. The piece was attached to a glass substrate and subjected to autoclaving at 50° C. and 0.49 MPa (5 kg/cm²) for 20 minutes. The adhesive strength of the adhesive layer was measured according to a test method of pressure sensitive adhesive tapes and sheets disclosed in JIS Z0237, 2000, using a tensile tester at a stripping angle of 90° and a stripping rate of 0.3 m/min under 23° C./50% RH conditions.

6. Adhesion to Substrate

While measuring adhesive strength, adhesion was evaluated. In Tables 6 and 7, the adhesive layer not separated from the substrate is indicated by "O," while the adhesive layer separated from the substrate is indicated by "X."

7. Adherend Contamination Resistance

A contact angle of the glass substrate was measured before and after measurement of adhesive strength. The contact angle was measured according to a test method of wettability of a glass substrate disclosed in JIS R3257 (1999). In Tables 6 and 7, when a change in the contact angle of the glass substrate before and after measurement of the adhesive strength was 3° or less, it is indicated by "O," and when a change in the contact angle of the glass substrate before and after measurement of the adhesive strength exceeded 3°, it is indicated by "X."

8. Low-Temperature Stability

Each adhesive layer-attached polarizer plate, left at 23° C. and 50% RH for 0.5 days, was cut into a 120 mm (MD direction of the polarizer plate)×60 mm piece. The piece was attached to a glass substrate and subjected to autoclaving at 50° C. and 0.49 MPa (5 kg/cm²) for 20 minutes. Then, the glass substrate was left at −40° C. for 120 hours, followed by observation of appearance. In Tables 6 and 7, no occurrence of bubbles, separation, peeling, or recrystallized materials is indicated by "O," while occurrence of bubbles, separation, peeling, or recrystallized materials is indicated by 9. Reworkability While measuring adhesive strength, a separated state was observed. In Tables 6 and 7, appearance of interface failure is indicated by "O," and appearance of adhesion and/or cohesion failure of the adhesive to the glass substrate (adherend) is indicated by As shown in Tables 6 and 7, the adhesive compositions (Examples 1 to 8) according to an embodiment had excellent pot life and curing accelerating effects, as compared with the adhesive compositions of Comparative Examples 1 to 13. Accordingly, the adhesive compositions of the embodiments may be considered to remarkably improve workability and productivity. Moreover, as may be clearly seen from Tables 6 and 7, the polarizer plates prepared using the adhesive compositions (Examples 1 to 8) of the embodiments had excellent light leakage resistance, durability, substrate adhesion, adherend contamination resistance, low-temperature stability, and reworkability as compared with the polarizer plates (Comparative Examples 1 to 13). Further, in the tables, the mark "−" means that the adhesive composition couldn't be subjected to performance testing since the viscosity of the adhesive composition immediately after preparation couldn't be measured due to gelation of the adhesive composition within 10 minutes after preparation.

Preparation Example 22

60 parts by weight of n-butyl acrylate (Nihon Shokubai, Co., Ltd.), 30.5 parts by weight of 2-ethylhexyl acrylate (Nihon Shokubai, Co., Ltd.), 2.5 parts by weight of 2-vinyl acetate (Denki Kagaku Kogyo Co., Ltd.), 7 parts by weight of acrylic acid (Nihon Shokubai, Co., Ltd.), and 150 parts by weight of ethyl acetate were placed in a flask equipped with a reflux condenser and an agitator, and then were heated to 65° C. under a nitrogen atmosphere. 0.1 parts by weight of azobisisobutyronitrile (AIBN) was added, and 0.05 parts by weight of AIBN was further added after 1 hour, followed by polymerization for 6 hours while maintaining the mixture at 65° C. After polymerization, the mixture was diluted with 36 parts by weight of ethyl acetate and cooled to room temperature, thereby obtaining a solution of a polymer (A-22). The polymer solution (A-22) had a solid content of 35% and a viscosity of 4,000 mPa s. The obtained polymer (A-22) had a weight average molecular weight of 750,000 g/mol.

Preparation Examples 23~43

Solutions of polymers (A-23) to (A-43) were prepared by the same process as in Preparation Example 22, except that the monomers were mixed according to the compositions listed in Tables 8 and 9 of FIGS. 5 and 6. Then, the solid contents and the viscosities of the solutions of the polymers (A-23) to (A-43) and the weight average molecular weights of the polymers (A-23) to (A-43) were measured, and results are shown in Tables 8 and 9. In Tables 8 and 9, "BA," "2EHA," "MA," "VAc," "HEA," "4HBA," "HEAA," "AA," and "AM" refer to butyl acrylate, 2-ethylhexyl acrylate, methyl acrylate, vinyl acetate, 2-hydroxyethyl acrylate, 4-hydroxybutyl acrylate, N-2-hydroxyethyl acrylamide, acrylic acid, and acrylamide, respectively.

TABLE 10

| | |
|---|---|
| BA | butyl acrylate |
| 2EHA | 2-ethylhexyl acrylate |
| MA | methyl acrylate |
| VAc | vinyl acetate |
| HEA | 2-hydroxyethyl acrylate |
| 4HBA | 4-hydroxybutyl acrylate |
| HEAA | N-2-hydroxyethyl acrylamide |
| AA | acrylic acid |
| AM | acrylamide |

Example 9

286 parts by weight of the solution of the polymer (100 parts by weight in terms of solid content) obtained in Preparation Example 22, 0.4 parts by weight of CARBODI-LITE® V-05 (B-1, Nisshinbo Chemical Inc.) as a carbodiimide crosslinker (B), 0.05 parts by weight of PLENACT KR TTS (C-1, Azinomoto Fine-Techno Co., Ltd.) as a group IV-containing organic compound (C), and 0.2 parts by weight of Duranate™ 24A-100 (D-2, hexamethylene diisocyanate biuret, Asahi Kasei Corporation) as an isocyanate crosslinker (D) were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 90° C. for 3 minutes, thereby forming an adhesive layer. Then, the adhesive layer was attached to a PET film (Lumirror® S10#25, Thickness: 23 μm, Toray Industries, Inc.), thereby producing an adhesive sheet (1).

Examples 10~16 and Comparative Examples 14~27

Adhesive composition solutions and adhesive sheets were prepared according to the same process as in Example 9 except that the polymers obtained in Preparation Examples 23 to 43, carbodiimide crosslinkers, group IV-containing organic compounds, isocyanate crosslinkers, and other additives were used according to the compositions listed in Tables 12 and 13 of FIGS. 7 and 8. Accordingly, adhesive sheets (2) to (8) and comparative adhesive sheets (1) to (14) were obtained. Details of carbodiimide crosslinkers B-1, B-2, and B-3, group IV-containing organic compounds C-1, C-2, C-3, C-4, C-5, and C-6, isocyanate crosslinkers D-1, D-2, D-3, D-4, and D-5, and other additives F-1, F-2, F-3, F-4, and F-5 are illustrated in Table 11.

TABLE 11

B-1: CARBODILITE ® V-05 (Nisshinbo Chemical Inc.)
B-2: CARBODILITE ® V-09 (Nisshinbo Chemical Inc.)
B-3: CARBODILITE ® V-01 (Nisshinbo Chemical Inc.)
C-1: PLENACT ® KR TTS (Azinomoto Fine-Techno Co., Ltd.)
C-2: PLENACT ® KR 55 (Azinomoto Fine-Techno Co., Ltd.)
C-3: PLENACT ® KR 41B (Azinomoto Fine-Techno Co., Ltd.)
C-4: PLENACT ® KR 46B (Azinomoto Fine-Techno Co., Ltd.)
C-5: KEN-REACT ® KZ TPP (Kenrich Petrochemicals Co., Ltd.)
C-6: di-n-butoxytitan bis(acetonate)(Nacemtitan, Nippoin Kagaku Co., Ltd.)
D-1: trimethylolpropane/tolylene diisocyanate (Colonate L ®, Nippon Polyurethane Industry Co., Ltd.)
D-2: Colonate ® HX (Nippon Polyurethane Industry Co., Ltd.)
D-3: Smidule ® N-75 (Smika Byer Urethane Co., Ltd.)
D-4: Aquanate ™ 210 (Nippon Polyurethane Industry Co., Ltd.)
D-5: Duranate ™ 24A-100 (Asahi Kasei Chemical Corporation)
F-1: 1-butylimidazole (Tokyo Kasei Kogyo Co., Ltd.)
F-2: 1,2-dimethylimidazole (Tokyo Kasei Kogyo Co., Ltd.)
F-3: Alumichelate ® A (Kawaken Fine Chemicals Co., Ltd.)
F-4: dibutyl tin dilaurate (Tokyo Kasei Kogyo Co., Ltd.)
F-5: acetylacetone (Tokyo Kasei Kogyo Co., Ltd.)

Physical properties of the surface protective films obtained according to Examples 9 to 16 and Comparative Examples 14 to 27 were evaluated as follows.

1. Gel Fraction

Instead of a PET film including each of the adhesive layers according to Examples 9 to 16 and Comparative examples 14 to 27, each adhesive layer was deposited on a stripped polyester film to a dry thickness of 25 μm and subjected to adhesive processing (crosslinking), followed by measurement of gel fraction after storage for 0.5 days and also after storage for 7 days at 23° C. and 50% RH. That is, about 0.1 g of the adhesive composition, left at 23° C. and 50% RH, was weighed and defined as $W_1$ (g). This composition was placed in a sample bottle, and about 30 g of ethyl acetate was added thereto and left for 24 hours. After a predetermined time, the contents of the bottle were filtered through a 200-mesh stainless steel mesh (weight: $W_2$ (g)). The mesh and the remaining materials were dried at 90° C. for 1 hour, and the total weight $W_3$ (g) was measured. The gel fraction was calculated by Equation 2 using the measured values:

$$\text{Gel fraction } (\%) = \{(W_3 - W_2)/W_1\} \times 100. \qquad \text{[Equation 2]}$$

2. Metal Corrosion Suppression and Prevention Properties

The adhesive layer of each adhesive sheet, left at 23° C. and 50% RH for 0.5 days, was attached to aluminum foil and left at 60° C. and 90% RH for 2 days, followed by observation of corrosion. In Tables 12 and 13, no change is indicated by "O," and whitening is indicated by "X."

3. Adhesive Strength

Each adhesive sheet, left at 23° C. and 50% RH for 0.5 days, was cut into a 25 mm wide piece. The piece was pressed to a stainless steel plate by reciprocating a 2-kg roller once thereon, and left at 23° C. and 50% RH for 20 minutes. Then, the adhesive strength was measured according to a test method of pressure sensitive adhesive tapes and sheets disclosed in JIS Z0237 (2000); using a tensile tester at a stripping angle of 180° and a stripping rate of 0.3 m/min under 23° C./50% RH conditions.

4. Adhesion to Substrate

In measurement of adhesive strength, adhesion to each adhesive sheet (substrate) was evaluated. In Tables 12 and 13, the adhesive layer not separated from the substrate is indicated by "O," while the adhesive layer separated from the substrate is indicated by "X."

5. Adherend Contamination Resistance

The contact angle of the stainless steel plate was measured before and after measurement of adhesive strength. The contact angle was measured according to a test method of wettability of a glass substrate disclosed in JIS R3257, 1999. In Tables 12 and 13, when a change in the contact angle of the stainless steel plate before and after measurement of the adhesive strength was 3° or less, it is indicated by "O," and when a change in the contact angle of the stainless steel plate before and after measurement of the adhesive strength exceeded 3°, it is indicated by "X."

6. Low-Temperature Stability

Each adhesive sheet, left at 23° C. and 50% RH for 0.5 days, was pressed to a stainless steel plate by reciprocating a 2-kg roller once thereon, and left at 23° C. and 50% RH for 1 hour. Then, the stainless steel plate was left at −40° C. for 120 hours, followed by observation of appearance. In Tables 12 and 13, no occurrence of bubbles, separation, peeling, or recrystallized materials is indicated by "O," while occurrence of bubbles, separation, peeling, or recrystallized materials is indicated by "X."

7. Transparency of Adhesive Layer

Each adhesive sheet, left at 23° C. and 50% RH for 0.5 days, was observed with the naked eye to identify transparency of the adhesive film. In Tables 12 and 13, suitable transparency is indicated by "O" and turbidity of the adhesive layer is indicated by "X."

8. Heat Resistance

Each adhesive sheet, left at 23° C. and 50% RH for 0.5 days, was pressed to a stainless steel plate by reciprocating a 2-kg roller once thereon, and left at 23° C. and 50% RH for 1 hour. Then, the stainless steel plate was left at 80° C. for 500 hours, followed by observation of appearance. In Tables 12 and 13, no appearance of bubbles, separation, or peeling is indicated by "O," while appearance of bubbles, separation, or peeling is indicated by "X."

9. Humidity/Heat Resistance

Each adhesive sheet, left at 23° C. and 50% RH for 0.5 days, was pressed to a stainless steel plate by reciprocating a 2-kg roller once thereon, and left at 23° C. and 50% RH for 1 hour. Then, the stainless steel plate was left at 60° C. and 90% RH for 500 hours, followed by observation of appearance. In Tables 12 and 13, no appearance of bubbles, separation, or peeling is indicated by "O," and appearance of bubbles, separation, or peeling is indicated by "X."

As may be seen in Tables 12 and 13, the adhesive compositions (Examples 9~16) of the embodiments had excellent pot life and curing accelerating effects as compared with the adhesive compositions of Comparative Examples 14~27. Accordingly, the adhesive compositions of the embodiments may be considered to remarkably improve workability and productivity. Moreover, the adhesive sheets according to Examples 9~16 of the embodiments had excellent substrate adhesion, adherend contamination resistance, low-temperature stability, transparency of the adhesive layers, heat resistance, and humidity/heat resistance as compared with the adhesive sheets of Comparative Examples 14~27.

By way of summation and review, an adhesive composition (for optical films) that includes an acrylic polymer, a titanium-based coupling agent and/or a zirconium-based coupling agent have been considered. Such an adhesive composition for optical films may exhibit excellent durability without light leakage under high-temperature and high-humidity conditions.

An adhesive composition (for a surface protective film of an optical member), which includes an acrylic polymer, an isocyanate compound, and an organic titanium oxide compound has been considered. Such an adhesive composition may have the same curing period and properties as those in the case of using an organic tin compound as a curing catalyst of the isocyanate compound.

Adhesive layers prepared from a composition that includes an acrylic polymer, a titanium-based coupling agent, and/or a zirconium-based coupling agent, or a composition that includes an acrylic polymer, an isocyanate compound, and an organic titanium oxide compound may require a long aging period (e.g., of 1 day or longer) until practicable adhesive performance may be achieved after crosslinking, thereby lowering productivity.

The embodiments provide an adhesive composition having a long pot life to provide excellent workability and exhibiting practical adhesive performance within a short aging time after adhesive processing.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims

What is claimed is:

1. An adhesive layer having a 7-day gel fraction that is within about ±5% of a 0.5-day gel fraction and the 0.5-day gel fraction of about 50% to about 95%, the 7-day gel fraction being measured after storage under conditions of about 23° C. and about 50% RH for about 7 days, and the 0.5-day gel fraction being measured after storage under conditions of about 23° C. and about 50% RH for about 0.5 days, wherein the adhesive layer is prepared from an adhesive composition including:
100 parts by weight of a (meth)acrylic copolymer,
about 0.05 to about 5 parts by weight of a carbodiimide crosslinker, and
about 0.01 to about 0.3 parts by weight of an organic group-containing compound, the organic group-containing compound including at least one selected from the group of titanium and zirconium.

2. The adhesive layer as claimed in claim 1, wherein the (meth)acrylic copolymer is prepared from a monomer mixture including:
about 0.1 to about 9 parts by weight of a carboxyl group-containing monomer,
0 to about 1 part by weight of a hydroxyl group-containing (meth)acrylic monomer, and
about 90 to about 99.9 parts by weight of a (meth)acrylic acid ester monomer, a total amount of the carboxyl group-containing monomer, the hydroxyl group-containing (meth)acrylic monomer, and the (meth)acrylic acid ester monomer being 100 parts by weight.

3. The adhesive layer as claimed in claim 1, further comprising about 0.05 to about 5 parts by weight of an isocyanate crosslinker.

4. The adhesive layer as claimed in claim 1, further comprising a silane coupling agent.

5. The adhesive layer as claimed in claim 1, further comprising an imidazole compound represented by Formula 1:

[Formula 1]

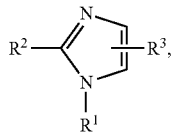

wherein $R^1$, $R^2$, and $R^3$ are each independently a hydrogen atom, a halogen atom, or a substituted or unsubstituted C1 to C10 linear or branched alkyl group.

6. The adhesive layer as claimed in claim 5, wherein the imidazole compound is present in the composition an amount of about 0.008 to about 0.2 parts by weight.

7. The adhesive layer as claimed in claim 1, wherein the adhesive composition has a viscosity (v1) 12 hours after preparation that is less than about 10% greater than a viscosity (v0) immediately after preparation.

8. An optical member comprising the adhesive layer as claimed in claim 1.

9. The optical member as claimed in claim 8, wherein:
the (meth)acrylic copolymer has a weight average molecular weight of about 2,000,000 to about 1,800,000 g/mol, and
the adhesive layer has an adhesive strength of about 0.5 to about 9 N/25 mm according to JIS Z0237.

10. The optical member as claimed in claim 8, wherein the adhesive layer has an adhesive strength of about 0.5 to about 9 N/25 mm according to JIS Z0237.

11. An adhesive sheet comprising the adhesive layer as claimed in claim 1.

12. The adhesive sheet as claimed in claim 11, wherein:
the (meth)acrylic copolymer has a weight average molecular weight of about 100,000 to about 1,000,000 g/mol, and
the adhesive layer has an adhesive strength of about 0.05 to about 20 N/25 mm according to JIS Z0237.

13. The adhesive sheet as claimed in claim 11, wherein the adhesive layer has an adhesive strength of about 0.05 to about 20 N/25 mm according to JIS Z0237.

* * * * *